United States Patent
Saito

(10) Patent No.: US 6,922,197 B2
(45) Date of Patent: Jul. 26, 2005

(54) METHOD OF GENERATING COLOR SEPARATION TABLE

(75) Inventor: Kazuhiro Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/765,942

(22) Filed: Jan. 29, 2004

(65) Prior Publication Data

US 2004/0183814 A1 Sep. 23, 2004

(30) Foreign Application Priority Data

Jan. 30, 2003 (JP) ........................................ 2003-022265

(51) Int. Cl.$^7$ ............................................... G09G 5/02
(52) U.S. Cl. ........................ 345/602; 345/604; 358/1.9
(58) Field of Search ................................ 345/589, 601, 345/602, 603, 604, 606, 607; 358/1.1, 1.9; 382/162, 167

(56) References Cited

U.S. PATENT DOCUMENTS

| | | | | |
|---|---|---|---|---|
| 5,390,035 A | * | 2/1995 | Kasson et al. ............... | 358/518 |
| 6,072,464 A | * | 6/2000 | Ozeki .......................... | 345/603 |
| 6,292,195 B1 | * | 9/2001 | Shimizu et al. ............. | 345/604 |
| 6,571,010 B1 | * | 5/2003 | Inoue .......................... | 382/162 |
| 6,587,223 B1 | * | 7/2003 | Yamaguchi ................. | 358/1.9 |
| 2002/0021458 A1 | | 2/2002 | Saito et al. .................. | 358/515 |
| 2003/0072016 A1 | * | 4/2003 | Dalrymple et al. .......... | 358/1.9 |
| 2003/0076516 A1 | | 4/2003 | Saito ........................... | 358/1.9 |
| 2003/0202197 A1 | | 10/2003 | Saito et al. .................. | 358/1.9 |
| 2003/0234946 A1 | | 12/2003 | Saito ........................... | 358/1.9 |
| 2004/0027406 A1 | | 2/2004 | Nishikawa et al. ........... | 347/19 |
| 2004/0070777 A1 | | 4/2004 | Nishikawa et al. .......... | 358/1.9 |
| 2004/0100640 A1 | | 5/2004 | Saito ........................... | 358/1.1 |
| 2004/0141642 A1 | * | 7/2004 | Zeng et al. .................. | 382/162 |

FOREIGN PATENT DOCUMENTS

JP 2002/33930 1/2002

* cited by examiner

*Primary Examiner*—Matthew Luu
(74) *Attorney, Agent, or Firm*—Fitzpatrick, Cella, Harper & Scinto

(57) ABSTRACT

This invention has as its object to provide a color separation table generation method which can improve grayscale characteristics and can suppress generation of a pseudo edge of a reproduced image by introducing a nonlinear interpolation method using a finite element method. To this end, according to the present invention, a color separation table generation method of generating a color separation table used to separate an input color into a plurality of color agent colors, includes: a first table generation step of generating color separation data on a first line that connects white and black points in the color separation table; a second table generation step of generating color separation data on a plurality of second lines each of which connects the white point and each of primary color points each expressed by one of the color agent colors and secondary color points each expressed by two of the color agent colors; a third table generation step of generating color separation data on a plurality of third lines each of which connects each of the primary and secondary color points and the black point; a fourth table generation step of generating color separation data on a plurality of fourth lines each of which connects the primary and secondary color points; and an interpolation step of generating color separation data at grid points inside a three-dimensional color space by an interpolation process based on the color separation data on the first to fourth lines, wherein the interpolation step includes a step of executing an interpolation process using a finite element method for each triangular plane specified on the color space.

12 Claims, 24 Drawing Sheets

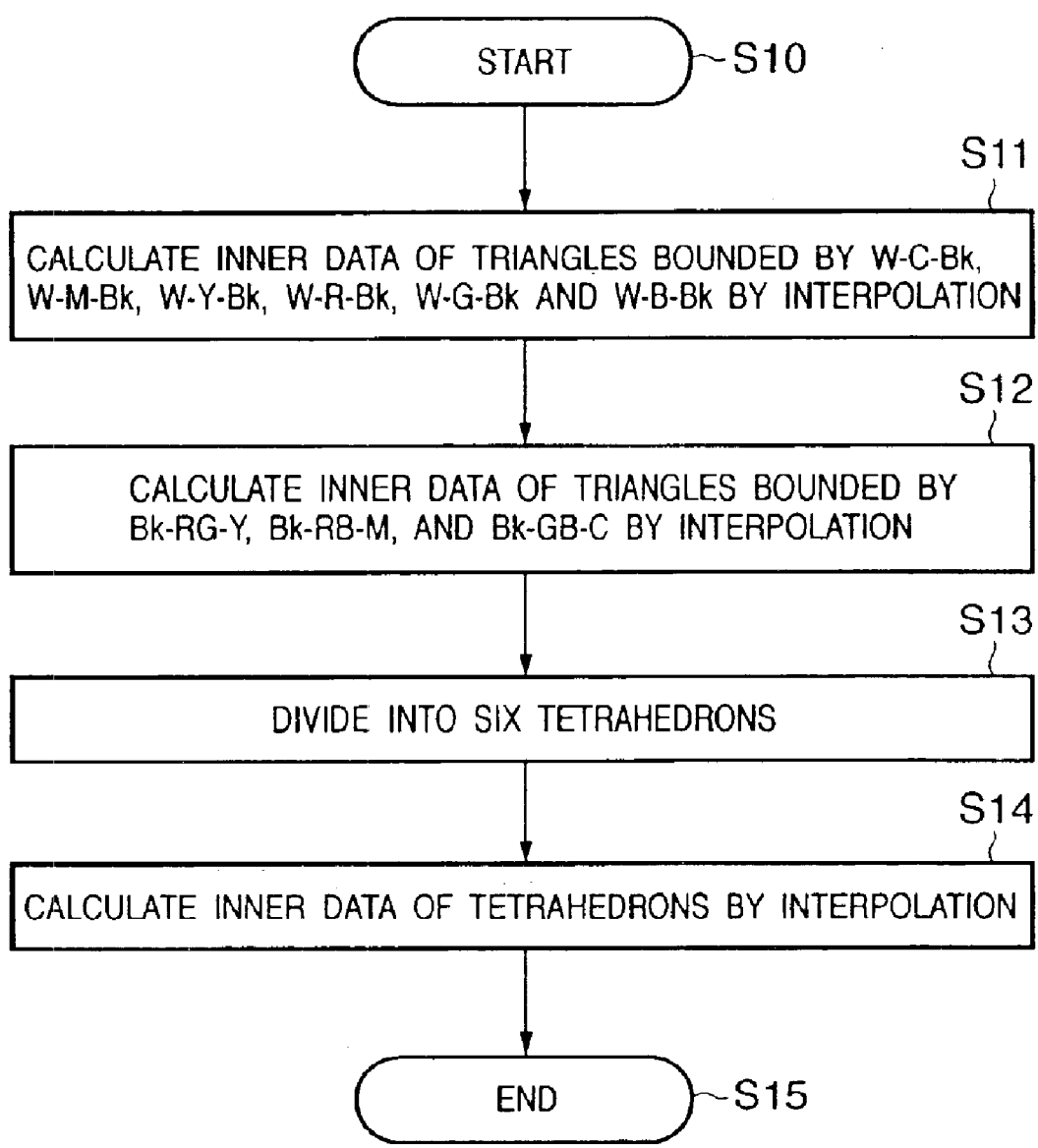

SHAPE DETERMINATION DIRECTION

FIG. 14A

| SHAPE DETERMINATION RESULT OF AB = CONSTANT | | SHAPE DETERMINATION RESULT OF AO | | | |
|---|---|---|---|---|---|
| | | CONSTANT | MONOTONE INCREASE | MONOTONE DECREASE | UPWARD CONVEX |
| SHAPE DETERMINATION RESULT OF BO | CONSTANT | | | | |
| | MONOTONE INCREASE | | | | |
| | MONOTONE DECREASE | | | | |
| | UPWARD CONVEX | | | | |

FIG. 14B

| SHAPE DETERMINATION RESULT OF AB = MONOTONE INCREASE | | SHAPE DETERMINATION RESULT OF AO | | | |
|---|---|---|---|---|---|
| | | CONSTANT | MONOTONE INCREASE | MONOTONE DECREASE | UPWARD CONVEX |
| SHAPE DETERMINATION RESULT OF BO | CONSTANT | | | | |
| | MONOTONE INCREASE | | | | |
| | MONOTONE DECREASE | | | | |
| | UPWARD CONVEX | | | | |

FIG. 14C

| SHAPE DETERMINATION RESULT OF AB = MONOTONE DECREASE | | SHAPE DETERMINATION RESULT OF AO | | | |
|---|---|---|---|---|---|
| | | CONSTANT | MONOTONE INCREASE | MONOTONE DECREASE | UPWARD CONVEX |
| SHAPE DETERMINATION RESULT OF BO | CONSTANT | | | | |
| | MONOTONE INCREASE | | | | |
| | MONOTONE DECREASE | | | | |
| | UPWARD CONVEX | | | | |

FIG. 14D

| SHAPE DETERMINATION RESULT OF AB = UPWARD CONVEX | | SHAPE DETERMINATION RESULT OF AO | | | |
|---|---|---|---|---|---|
| | | CONSTANT | MONOTONE INCREASE | MONOTONE DECREASE | UPWARD CONVEX |
| SHAPE DETERMINATION RESULT OF BO | CONSTANT | | | | |
| | MONOTONE INCREASE | | | | |
| | MONOTONE DECREASE | | | | |
| | UPWARD CONVEX | | | | |

…

METHOD OF GENERATING COLOR SEPARATION TABLE

FIELD OF THE INVENTION

The present invention relates to an image forming apparatus which has a table used to perform color separation into, e.g., color agent colors for image formation, and a method of generating that table.

BACKGROUND OF THE INVENTION

Conventionally, as a method of generating a color separation table for a process for separating a color signal into colors of color agents (inks) of a color printer (to be referred to as an ink color separation process hereinafter), method 1 which divides a color separation table defined by a cube into six tetrahedrons, further divides each tetrahedron into triangles, and obtains color separation amounts on a grid inside each triangle by an interpolation process from color separation tables of the three sides of the triangle has been proposed (Japanese Patent Laid-Open No. 2002-33930). This method 1 has proposed to calculate contour lines of ink amounts of the color separation tables of the three sides, and then obtaining color separation amounts inside the triangle. To do this, after linear contour lines are calculated, smooth table creation is implemented by a nonlinear curve approximation process.

However, in the conventional method, when the color separation tables of the three sides have complicated shapes, it is difficult to calculate linear contour lines from ink amounts of the color separation tables of the three sides. In some cases, solutions cannot be obtained. Furthermore, when a nonlinear interpolation process is to be implemented to improve inner grayscale characteristics, contour lines calculated in advance by a linear interpolation process must undergo a complicated process, i.e., nonlinear curve approximation.

SUMMARY OF THE INVENTION

The present invention has been made in consideration of the above prior art, and has as its object to provide a method which can reliably obtain ink amounts inside a triangle by a simple process, and can prevent any pseudo edge from being generated in a reproduced image since information of ink amounts of the three sides can be reflected, and an image forming apparatus using that method.

In order to achieve the above object, according to the present invention, a color separation table generation method of generating a color separation table used to separate an input color into a plurality of color agent colors, comprises:

a first table generation step of generating color separation data on a first line that connects white and black points in the color separation table;

a second table generation step of generating color separation data on a plurality of second lines each of which connects the white point and each of primary color points each expressed by one of the color agent colors and secondary color points each expressed by two of the color agent colors;

a third table generation step of generating color separation data on a plurality of third lines each of which connects each of the primary and secondary color points and the black point;

a fourth table generation step of generating color separation data on a plurality of fourth lines each of which connects the primary and secondary color points; and an interpolation step of generating color separation data at grid points inside a three-dimensional color space by an interpolation process based on the color separation data on the first to fourth lines, wherein the interpolation step includes a step of executing an interpolation process using a finite element method for each triangular plane specified on the color space.

Preferably, according to the present invention, the interpolation step includes a step of executing an addition process of an interpolation result of a two-point interpolation process based on two sides of the triangular plane, and an interpolation result of the finite element method.

Preferably, according to the present invention, the finite element method in the interpolation step executes an interpolation process based on a change in color agent amount on one side of the triangular plane.

Preferably, according to the present invention, the finite element method in the interpolation step executes an interpolation process based on a partial change in color agent amount on one side of the triangular plane.

Preferably, according to the present invention, the finite element method in the interpolation step applies a finite element method interpolation method exclusively for a region where color agent amounts are present as a result of the two-point interpolation process based on the two sides of the triangular plane.

Preferably, according to the present invention, the interpolation step includes a step of controlling interpolation result values based on the finite element method for respective regions.

Preferably, according to the present invention, the interpolation step includes a step of classifying changes in color agent amount on respective sides of the triangular plane into a plurality of shapes, setting an interpolation method on the basis of a combination of the shapes of the sides of the triangular plane, generating color separation data for grid points on the triangular plane by the set interpolation method, and setting an identical interpolation method when the same shape is obtained by inverting, rotating, or inverting and rotating the sides of the triangular plane.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flow chart showing an inner interpolation process;

FIGS. 14A to 14D are tables showing the relationship between the shape determination results of the respective sides and interpolation methods;

DETAILED DESCRIPTION OF THE PREFERRED EMBODIMENTS

The present invention is directed to a color separation table generation method that generates a color separation table used to make color separation of an input color into a plurality of color agent colors. The method comprises: generating color separation state on a first line that connects white and black points in a color separation table; generating color separation data on a plurality of second lines each of which connects the white point and each of primary color points each expressed by one of the color agent colors and secondary color points each expressed by two of the color agent colors; generating color separation data on a plurality of third lines each of which connects each of the primary and secondary color points and the black point; generating color separation data on a plurality of fourth lines each of which connects the primary and secondary color points; and generating color separation data at grid points inside a three-dimensional color space by an interpolation process based on the color separation data on the first to fourth lines. The last interpolation process is implemented by an interpolation process using a finite element method for a triangular plane specified on the color space.

Preferred embodiments according to the present invention will be described in detail hereinafter with reference to the accompanying drawings.

<First Embodiment>

Figure 1:
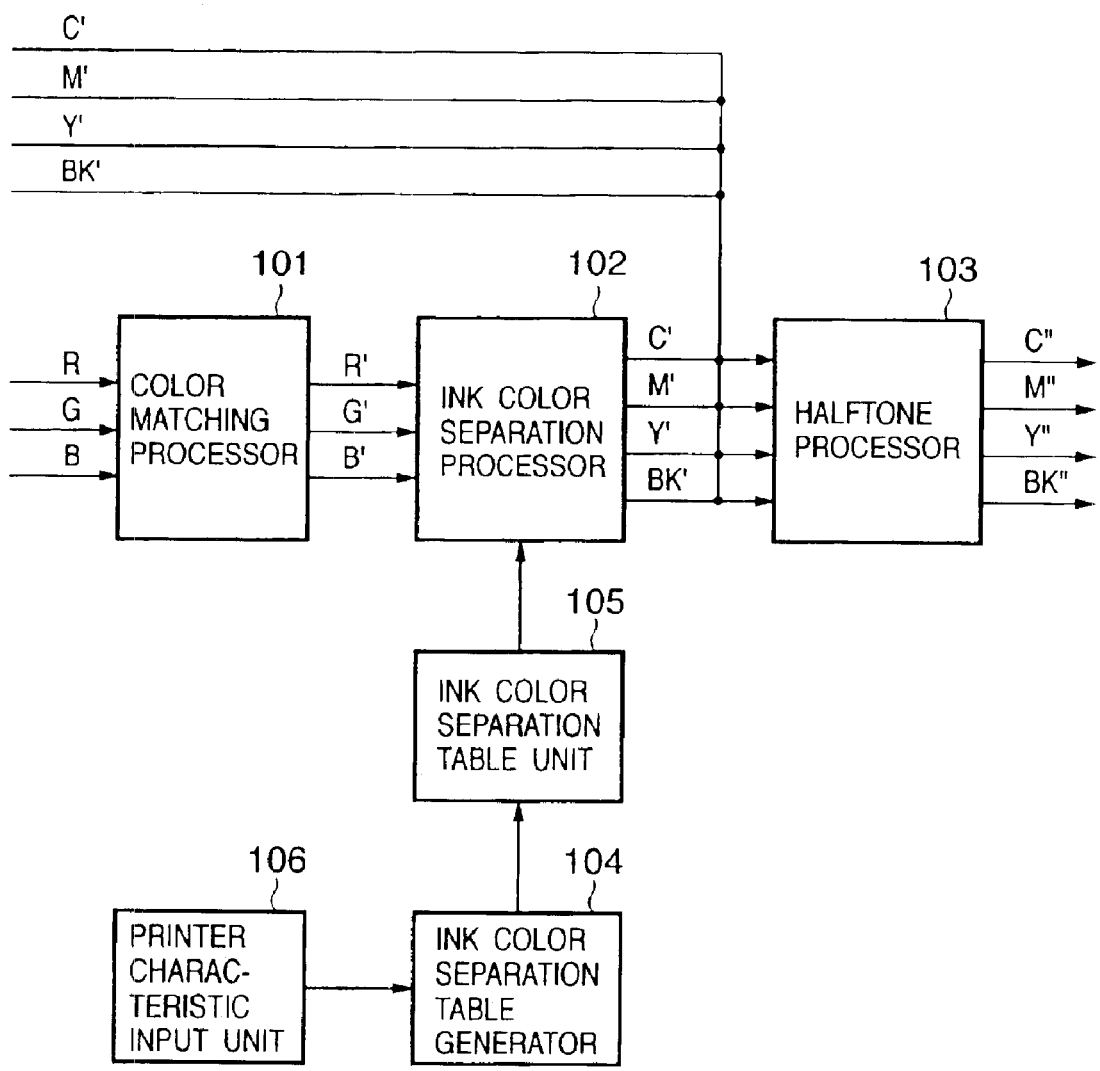
FIG. 1 is a block diagram showing the arrangement according to one embodiment of the present invention.

FIG. 1 shows a schematic arrangement used to implement a color separation process in an image processing apparatus (printer) according to this embodiment. Referring to FIG. 1, a color matching processor 101 matches R, G, and B color reproduction characteristics with printer colors. An ink color separation processor 102 converts R', G', and B' multi-valued data output from the color matching processor 101 into printer color agent (ink) colors C' (cyan), M' (magenta), Y' (yellow), and Bk' (black). A halftone processor 103 converts the C', M', Y', and Bk' multi-valued data output from the ink color separation processor 102 into data which have gray levels that the printer can express. An ink color separation table unit 105 provides a lookup table (LUT) required to implement an interpolation process in the ink color separation processor 102. An ink color separation table generator 104 generates an LUT of the ink color separation table unit 105.

Figure 2:
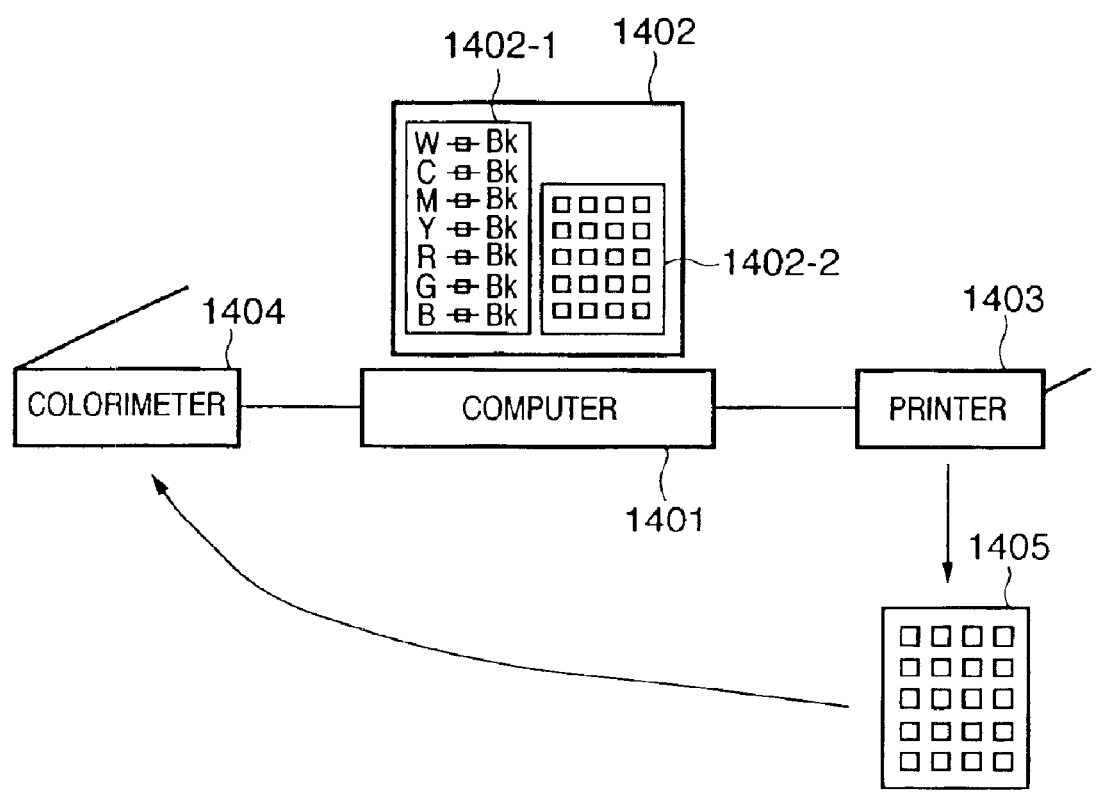
FIG. 2 is a schematic diagram showing the arrangement of an image forming system according to the embodiment of the present invention.

FIG. 2 shows a system arrangement including the image processing apparatus (printer) of this embodiment, and this system implements the arrangement shown in FIG. 1 described above.

Referring to FIG. 2, a computer 1401 holds patch data used to check printer characteristics, and is installed with application software for determining parameters by a user interface (UI) or the like. A monitor 1402 is connected to the computer 1401, and displays a black-mixing UI 1402-1 used to determine black-mixing points (to be described later), and a patch pattern 1402-2 used to check the printer characteristics. A color printer 1403 prints predetermined patch data. A patch sample 1405 is a printout printed out by the color printer 1403. A colorimeter 1404 measures the colors of the patch sample 1405.

C', M', Y', and Bk' patch data held by the computer 1401 shown in FIG. 2 are sent to the printer 1403 via a cable or network or the like (not shown) so as to be printed by the printer 1403. In the printer 1403, the C', M', Y', and Bk' patch data are directly sent to the halftone processor 103 while bypassing the color matching processor 101 and ink color separation processor 102 in FIG. 1, and undergo a halftone process alone by the halftone processor 103. Then, the processed data are printed.

The printed patch sample 1405 is measured by the colorimeter 1404 in FIG. 2, and measured values are fetched by the computer 1401. The patch sample 1405 includes grayscale patterns of primary colors C, M, Y, and Bk, secondary colors CM, MY, YC, CBk, MBk, and YBk, ternary colors CMY, CMBk, MYBk, and YCBk, quaternary colors CMYBk, and the like of the printer. That is, the patch sample 1405 need only include patterns that allow to check the ink characteristics of the printer.

In the system arrangement shown in FIG. 2, the colorimeter 1404 corresponds to a printer characteristic input unit 106 shown in FIG. 1. Likewise, the computer 1401 corresponds to the ink color separation table generator 104. Therefore, a detailed process of the ink color separation table generator 104, which will be described in detail using FIG. 3A and subsequent figures, is executed by the computer 1401. An ink color separation table generated by the computer 1401 is downloaded to the ink color separation table unit 105 via a cable, network, or the like (not shown).

A color image data process using the ink color separation table data downloaded to the printer 1403 will be explained below.

R, G, and B multi-valued color image data undergo a color matching process by the color matching processor 101 shown in FIG. 1 to be matched with the color reproduction characteristics of the monitor 1402 of the user. R', G', and B' data that have undergone the color matching process are separated into ink colors by the ink color separation processor 102 by an interpolation process on the basis of the data of the ink color separation table unit 105, which are generated in advance. C', M', Y', and Bk' multi-valued data obtained by ink color separation are converted into data which have gray levels that the printer can express, and are printed by the printer 1403.

A method of generating data to be downloaded to the ink color separation table unit 105 will be described in detail below.

Figure 3A:
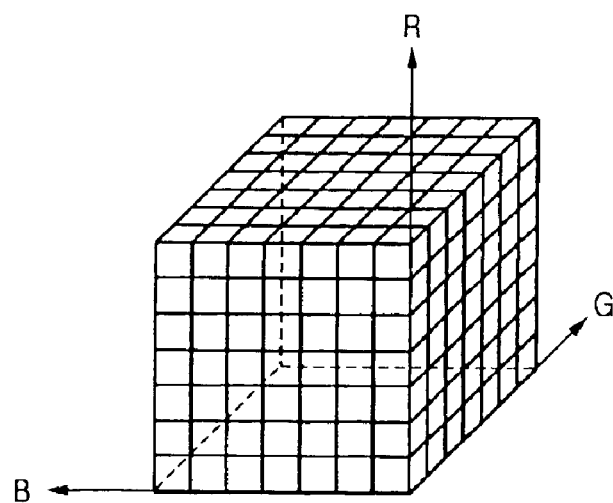
FIGS. 3A to 3C are views for explaining the structure of an ink color separation table and black-mixing points in the embodiment of the present invention.

FIG. 3A is a view for explaining the table configuration in the ink color separation table unit 105. As shown in FIG. 3A, data corresponding to grid points which are distributed to a cube on the RGB three-dimensional color space in a grid pattern are stored as a table in correspondence with input data R', G', and B'. In the ink color separation processor 102, if input R', G', and B' data are not located on a given grid of the ink color separation table unit 105, an interpolation process is made using neighboring grid point data. As an interpolation method, various methods such as tetrahedral interpolation, cubic interpolation, and the like are available. However, the interpolation method to be used is not particularly limited since the ink color separation table generation method and image process according to this embodiment do not depend on any specific interpolation method.

Figure 3B:
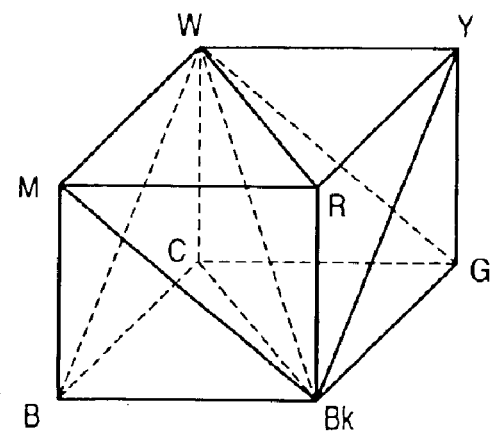
Figure 4:
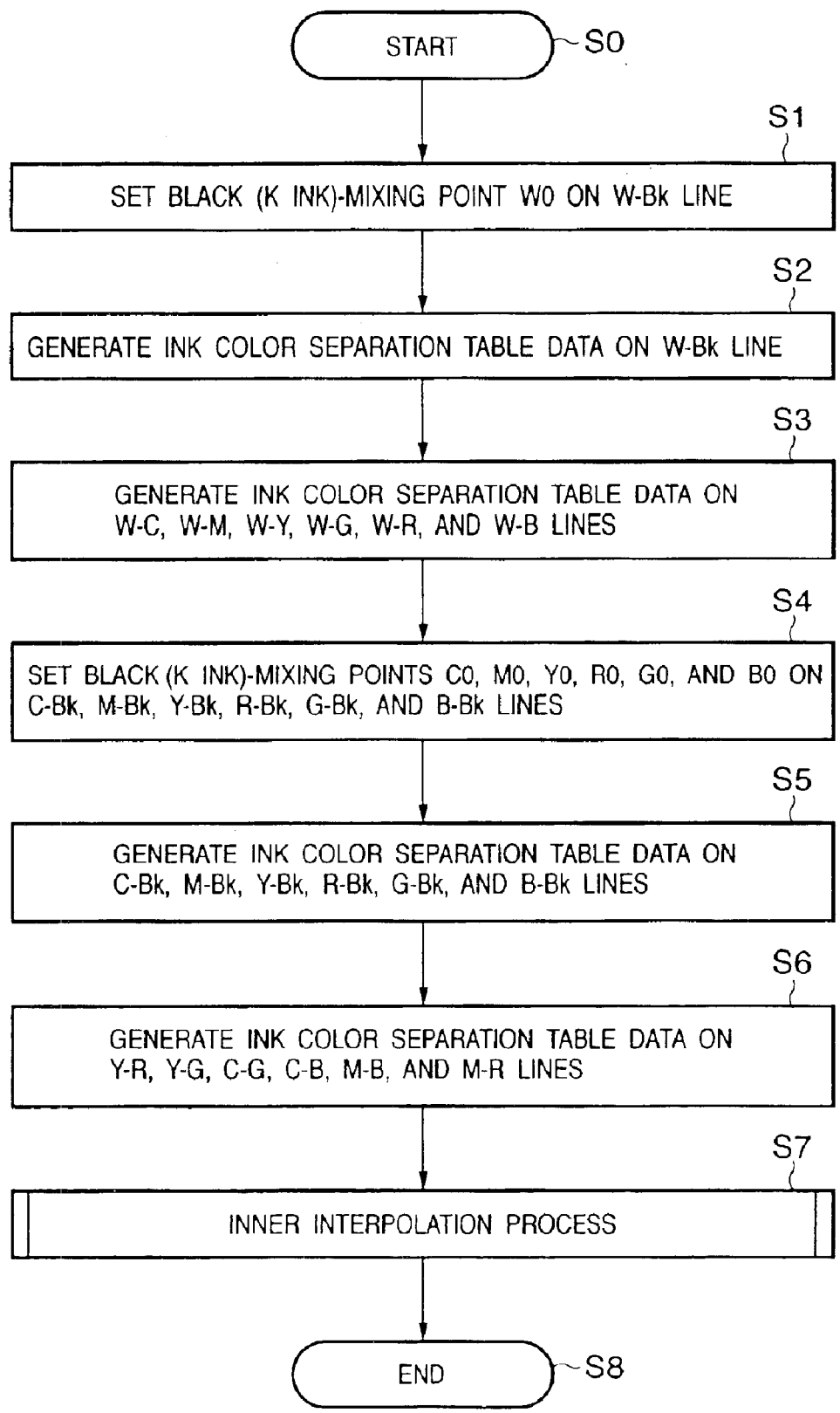
FIG. 4 is a flow chart showing an ink color separation table generation process.

FIG. 3B is a view for explaining a practical table generation method in FIG. 4 and subsequent figures. The eight vertices of the cube shown in FIG. 3A are respectively represented by W, C, M, Y, R, G, B, and Bk, and lines that connect W-C, W-M, W-Y, W-R, W-G, W-B, C-Bk, M-Bk, Y-Bk, R-Bk, G-Bk, B-Bk, and W-Bk are illustrated by the solid or broken lines. If the number of bits of input data (R', G', B') of the ink color separation processor 102 is 8, the coordinates of the vertices W, C, M, Y, R, G, B, and Bk are respectively expressed by:

W=(255, 255, 255) (white, i.e., the color of print paper)
C=(0, 255, 255) (cyan primary color)
M=(255, 0, 255) (magenta primary color)
Y=(255, 255, 0) (yellow primary color)
R=(255, 0, 0) (red primary color)
G=(0, 255, 0) (green primary color)
B=(0, 0, 255) (blue primary color)
Bk=(0, 0, 0) (black, i.e., the darkest point of the printer)

Figure 3C:
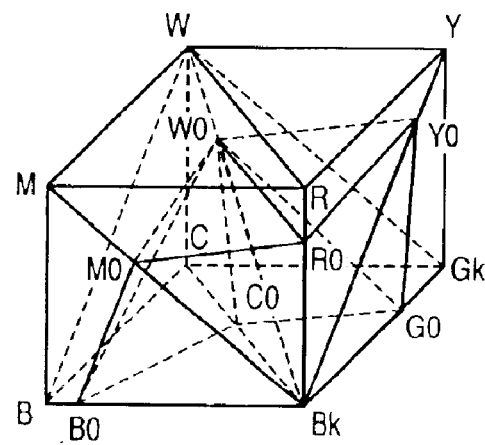

Note that input data are represented by symbols (R, G, and B) in FIGS. 3A to 3C.

The contents of the ink color separation table indicate ink amounts for each ink color component corresponding to each grid point. The contents of the ink color separation table are generated based on the above eight primary colors. For this purpose, the contents of the ink color separation table for these eight primary colors are given, and the following method may be used.

Ink amounts of respective color components are determined according to the color characteristics of inks used in actual image recording in place of those on an ideal color space. However, Y, M, C, and Bk are colors which should be recorded using single color inks. For this reason, color patches for Y, M, C, and Bk colors are printed first. In this case, these patches are printed using an ink color separation table in which Y, M, and C primary colors use only their color inks with a maximum density. For example, if the contents of the ink color separation table are expressed by (Y, M, C, Bk) using 8 bits per color for each grid point in FIG. 3A, when input data is Y, i.e., RGB=(255, 255, 0), the contents of the table at that grid point are (255, 0, 0, 0). The same applies to other colors. As for W, 0 can be set for all colors.

Color patches of W, Y, M, C, and Bk are printed by the printer 1403 and are measured by the colorimeter 1404. Each color measured by the colorimeter 1404 should become input data itself if it is expressed by R, G, and B. For example, if input data is color Y, i.e., RGB=(255, 255, 0), the values measured by the colorimeter should be (255, 255, 0). Hence, the colorimeter 1404 is adjusted so that measured colors of the ink primary colors match input data. Note that white is used as print paper, as a matter of course.

Next, color patches of R, G, and B expressed as mixed colors of Y, M, and C are printed. Grid points of R, G, and B colors of the ink color separation table are given with values that represent ink amounts which allow inks to express R, G, and B. These values can be approximate values. For example, as for R, ideal values, e.g., YMCBk= (255, 255, 0, 0) may be used as initial values. The printed color patches are measured by the calorimeter 1404, and are compared with input data. Since R, G, and B colors are expressed by mixed colors of ink primary colors, the difference between the measured data and input data results from an ink blending error in the ink color separation table. In order to eliminate such error, the contents of the ink color separation table are corrected. For example, when a patch of R is printed and the color components of the patch measured by the colorimeter are mixed with G and B components, correction for reducing a Y component or the like is applied to reduce these components to zero. Of course, the degree of such correction is qualitatively determined using a table which is given in advance based on the relationship or the like of ink colors and colors which are expressed by mixing inks.

As described in the above example, data at the vertices of the ink color separation table are given.

In the ink color separation table generation method of this embodiment, ink color separation table data on lines that connect W-C, W-M, W-Y, W-R, W-G, W-B, C-Bk, M-Bk, Y-Bk, R-Bk, G-Bk, B-Bk, and W-Bk are generated on the basis of the values of these vertices W, C, M, Y, R, G, B, and Bk. After that, ink amounts corresponding to inner grid points are generated by an inner interpolation process, thus generating all table data.

FIG. 3C is a view for explaining black-mixing points. Note that a black-mixing point indicates a point from which black (K ink) begins to be mixed in a color separation process. That is, the black-mixing point indicates a separation start point to K ink. In this embodiment, the user sets seven black-mixing points (W0, C0, M0, Y0, R, G0, B0) on seven lines W-Bk, C-Bk, M-Bk, Y-Bk, R-Bk, G-Bk, and B-Bk shown in FIG. 3C using the black-mixing UI 1402-1 shown in FIG. 2. Therefore, as can be seen from FIG. 3C, black-mixing points can be three-dimensionally and continuously controlled.

FIG. 4 is a flow chart showing a color separation table generation process by the ink color separation table generator 104.

Step S0 is the start step, and generation of a table to be downloaded to the ink color separation table unit 105 starts.

In step S1, black (K ink)-mixing point W0 is set on the W-Bk line shown in FIG. 3C. In this step, black-mixing point W0 on a gray line that connects white and black is determined using the black-mixing UI 1402-1 shown in FIG. 2 in consideration of the characteristics of the printer 1403.

In step S2, ink color separation table data are generated on the W-Bk line (gray line) on the basis of black-mixing point W0 set in step S1.

In step S3, ink color separation table data on W-C, W-M, W-Y, W-R, W-G, and W-B lines are generated. That is, ink color separation table data on lines that connect white and primary colors (C, M, Y) corresponding to the ink primary colors and lines that connect white and secondary colors indicating colors (R, G, B) expressed by two ink colors (i.e., on the W-C, W-M, W-Y, W-R, W-G, and W-B lines) are generated.

In step S4, black (K ink)-mixing points C0, M0, Y0, R0, G0, and B0 on C-Bk, M-Bk, Y-Bk, R-Bk, G-Bk, and B-Bk lines are set. That is, using the black-mixing UI 1402-1 shown in FIG. 2, black (K ink)-mixing points C0, M0, Y0, R0, G0, and B0 on the C-Bk, M-Bk, Y-Bk, R-Bk, G-Bk, and B-Bk lines are set.

In step S5, ink color separation table data on the C-Bk, M-Bk, Y-Bk, R-Bk, G-Bk, and B-Bk lines are generated.

In step S6, ink color separation table data on Y-R, Y-G, C-G, M-B, and M-R lines are generated.

In step S7, an inner interpolation process is executed. On an inner space formed by the respective lines generated in steps S1 to S6, ink amounts corresponding to respective grid points on this space are calculated by interpolation, thus generating ink color separation table data of the inner space.

In the table data generation in step S5, by generating table data set with optimal undercolor removal (UCR) amounts and black generation (BG) amounts for respective hue levels, table data which can minimize granularity of an image due to black (K ink) while maximizing the color gamut of the printer can be set.

Interpolation of each grid point on a line that connects two vertices in steps S3, S5, and S6 can be implemented by, e.g., linear interpolation. When a black-mixing point is present on that line, the values of Y, M, and C color components are determined first by linear interpolation. Then, by setting a Bk component at the black-mixing point to be zero and a Bk component at the vertex Bk to be a maximum density (e.g., 255), the values of the Bk component between these points are calculated by linear interpolation. Finally, amounts extracted as the Bk component, i.e., undercolor removal amounts are subtracted from the values of the Y, M, and C color components. For example, the output values of grid points on each line can be determined in this way.

<Inner Interpolation Process>

The inner interpolation process in step S7 will be described in detail below.

FIG. 5 is a flow chart showing details of the inner interpolation process in step S7.

In step S11, inner data of six triangles including W and Bk shown in FIG. 3B, i.e., W-C-Bk, W-M-Bk, W-Y-Bk, W-R-Bk, W-G-Bk, and W-B-Bk, are calculated by interpolation. The interpolation method of inner data of each triangle will be described later.

In step S12, inner data of six triangles including Bk, i.e., Bk-R-Y, Bk-G-Y, Bk-R-M, Bk-B-M, Bk-G-C, and Bk-B-C are calculated by interpolation. The interpolation method of inner data of each triangle will be described later.

Figure 6A:
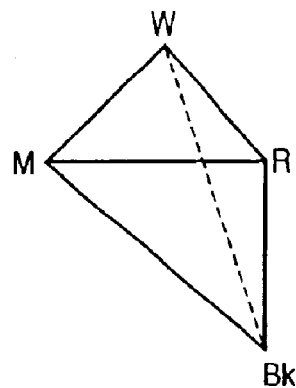
FIGS. 6A to 6F show examples of a plurality of tetrahedrons obtained by dividing a color space.
Figure 6B:
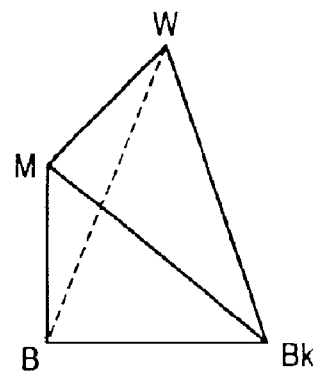
Figure 6C:
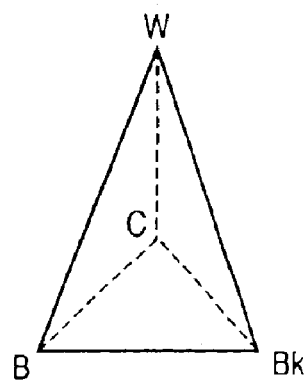
Figure 6D:
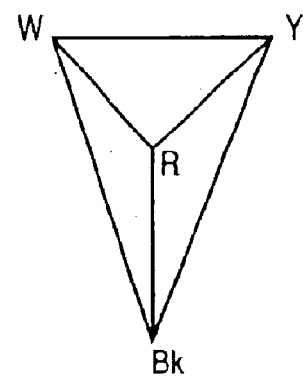
Figure 6E:
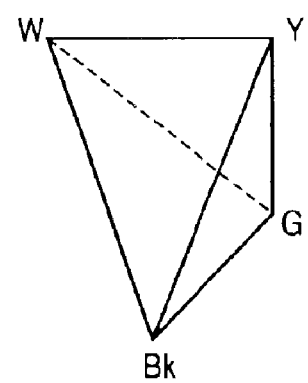
Figure 6F:
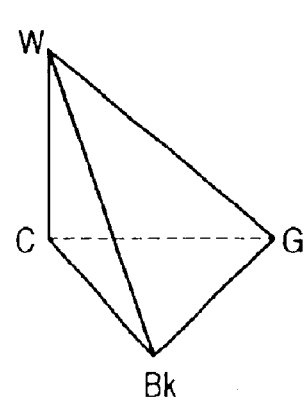

In step S13, the color space (cube) shown in FIG. 3B is divided into a plurality of tetrahedrons. FIGS. 6A to 6F show tetrahedrons obtained by dividing the color space. As shown in FIGS. 6A to 6F, the color space is divided into six tetrahedrons, one surface of which is defined by a triangle, and each tetrahedron undergoes an interpolation process. FIG. 6A shows a tetrahedron defined by the vertices W, R, M, and Bk; FIG. 6B, a tetrahedron defined by the vertices W, M, B, and Bk; FIG. 6C, a tetrahedron defined by the vertices W, C, B, and Bk; FIG. 6D, a tetrahedron defined by the vertices W, Y, R, and Bk; FIG. 6E, a tetrahedron defined by the vertices W, Y, G, and Bk; and FIG. 6F, a tetrahedron defined by the vertices W, C, G, and Bk. Grid points included in the surfaces of each tetrahedron are given by interpolation in steps S11 and S12 in FIG. 5. Note that division in step S13 is to execute an interpolation process for respective tetrahedrons upon generating ink color separation table data, and need not be made as a practical process.

Figure 7:
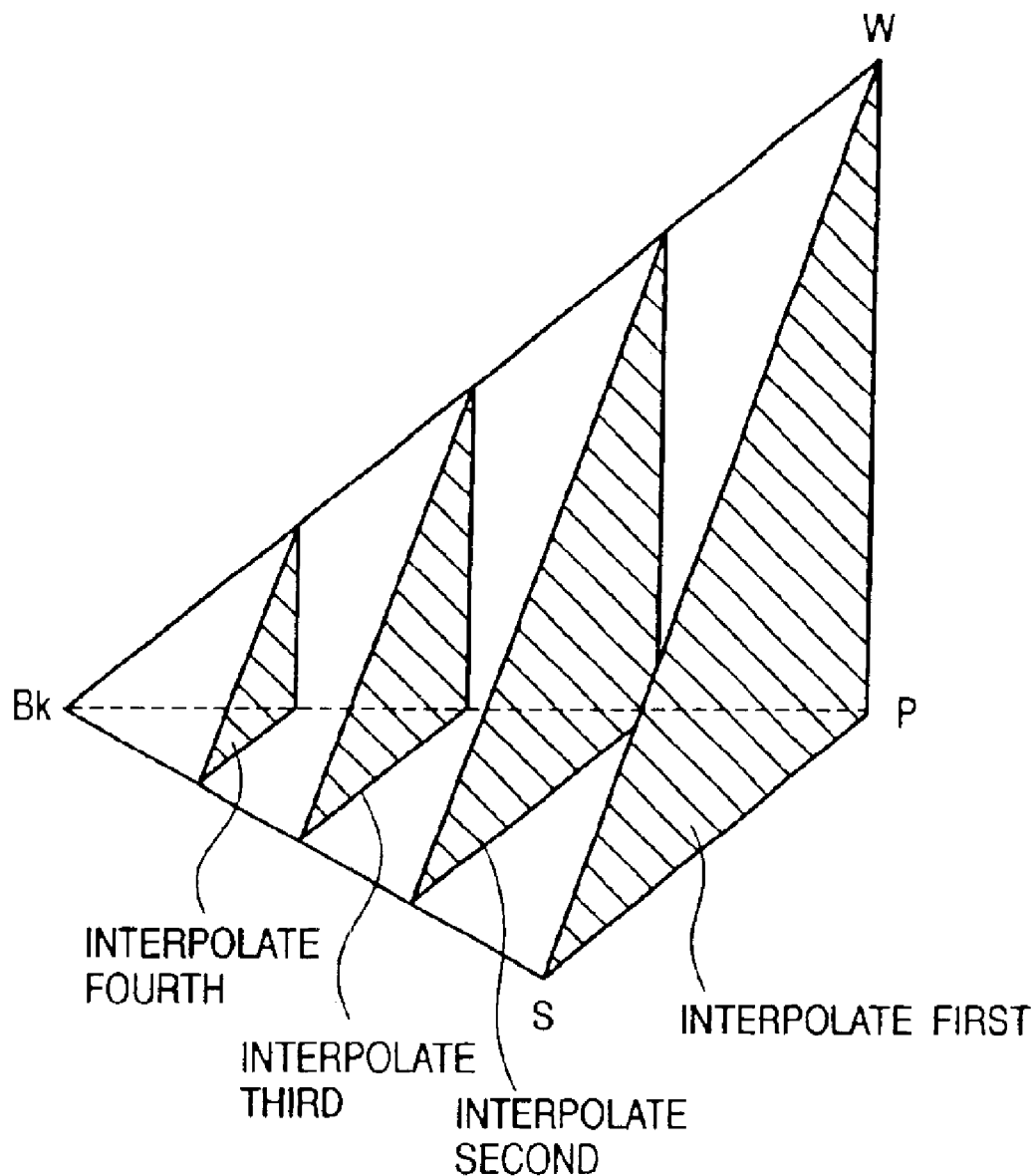
FIG. 7 shows the interpolation order inside a tetrahedron.

In step S14, the inner data of each of the tetrahedrons divided in step S13 are calculated by interpolation. The interpolation method used in this step will be described below with reference to FIG. 7. FIG. 7 shows an example of interpolation of a tetrahedron defined by vertices W, P, S, and Bk. Note that each of P and S is one of R, G, B, Y, M, and C, as shown in FIGS. 6A to 6F. The inner data of a triangle (defined by W, P, and S) which does not include Bk are calculated by interpolation, and the inner data of a triangle, which is parallel to the triangle which has been interpolated first and translated by one grid (grid point) toward Bk, are calculated by interpolation. Then, triangles which are translated by one grid each toward Bk undergo interpolation in turn. Note that the interpolation method of the inner data of each triangle will be described later. One grid corresponds to one grid point in the ink color separation table shown in FIG. 3A.

(Interpolation Method of Inner Data of Each Triangle)

The interpolation method of the inner data of each triangle in steps S11, S12, and S14 in FIG. 5 mentioned above will be described in detail using FIGS. 8 to 21C.

Figure 8:
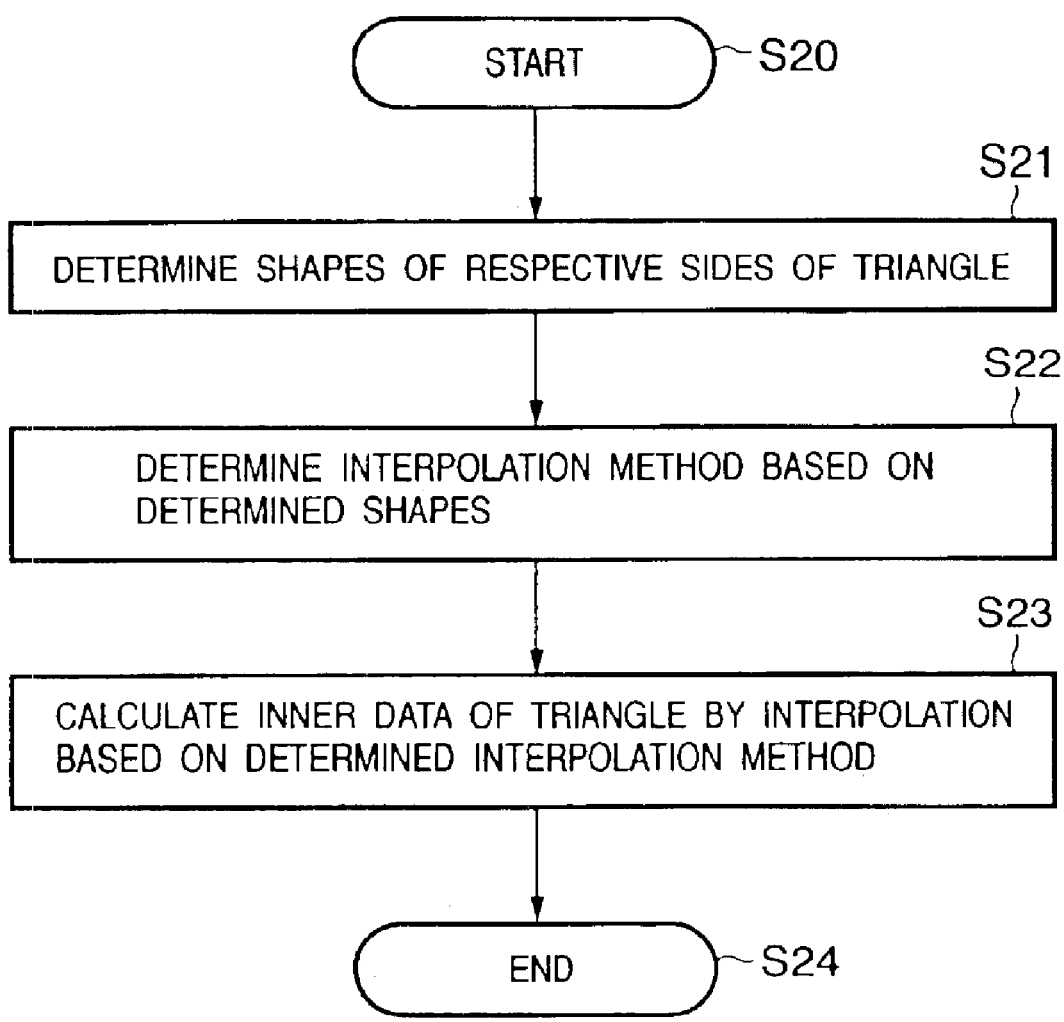
FIG. 8 is a flow chart showing an interpolation process of inner data of a triangle.

FIG. 8 is a flow chart showing the interpolation process of the inner data of each triangle. That is, FIG. 8 shows a process for calculating, by interpolation, ink amount data of respective ink colors to be stored in the ink color separation table in association with a predetermined grid point inside a triangle. Note that the interpolation process for one ink color will be described below. This interpolation process is executed for each of C, M, Y, and Bk inks.

Figure 9:
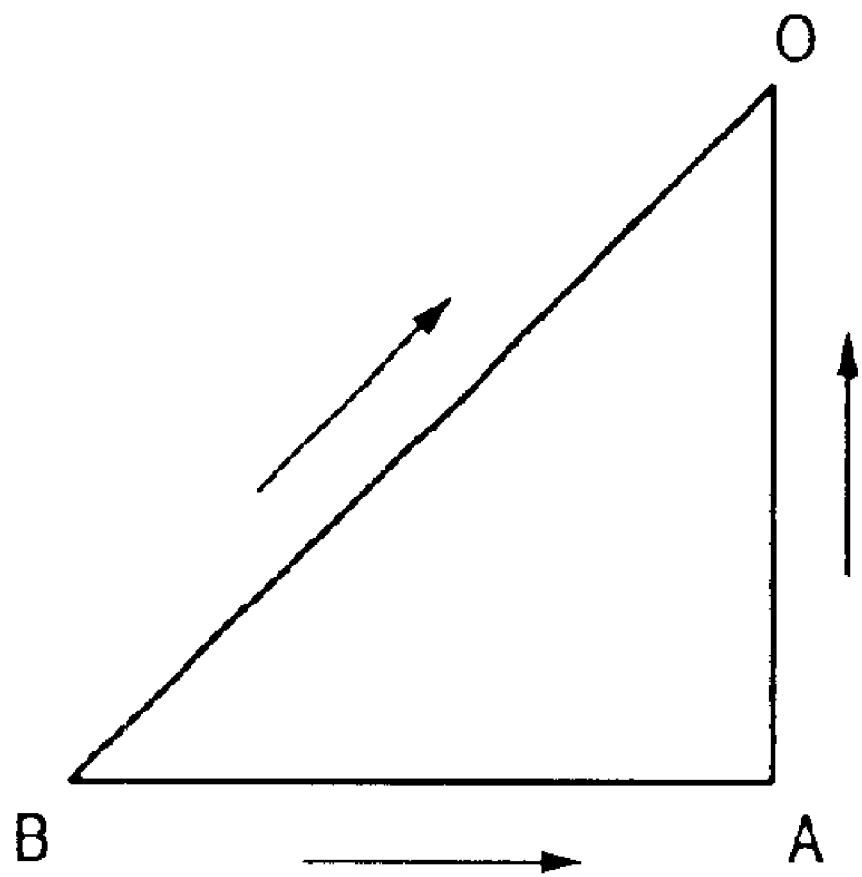
FIG. 9 is a view showing the determination directions of ink amount change shapes on the respective sides of a triangle.
Figure 10A:
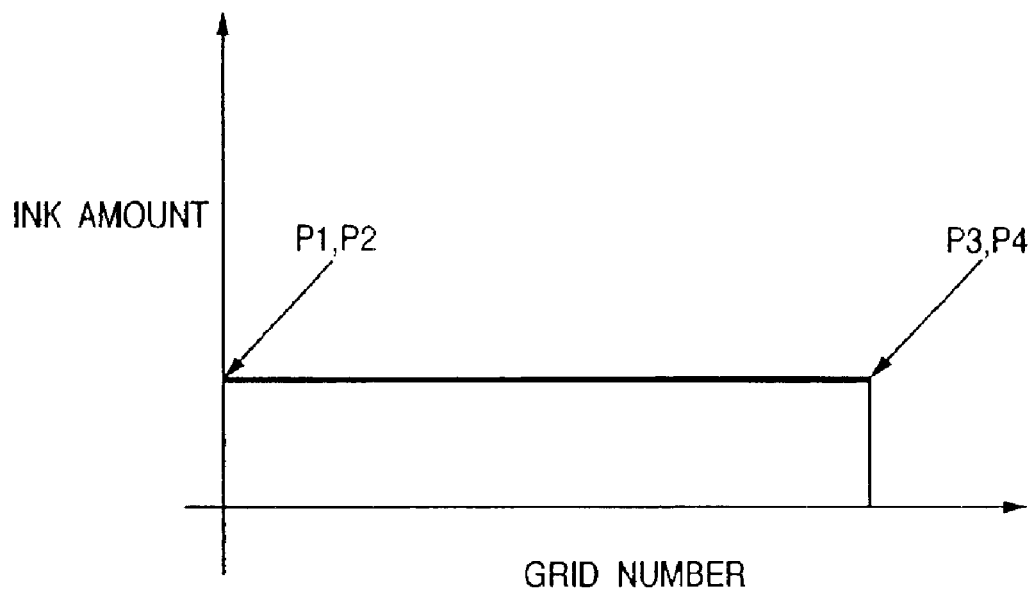
FIGS. 10A and 10B show setting examples of P1 to P4 when the shape is "constant"
Figure 10B:
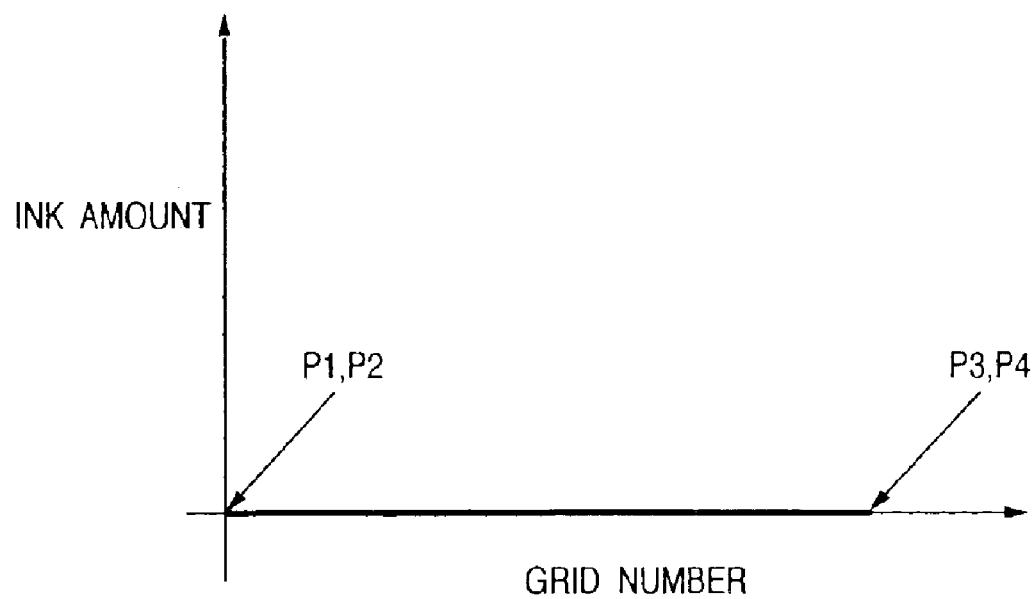
Figure 11A:
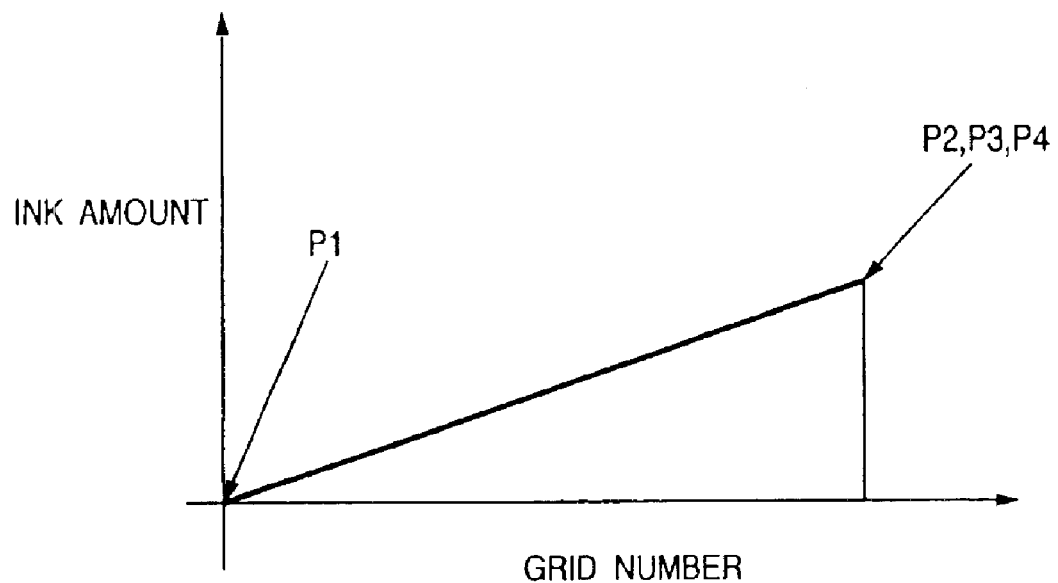
FIGS. 11A and 11B show setting examples of P1 to P4 when the shape is "monotone increase"
Figure 11B:
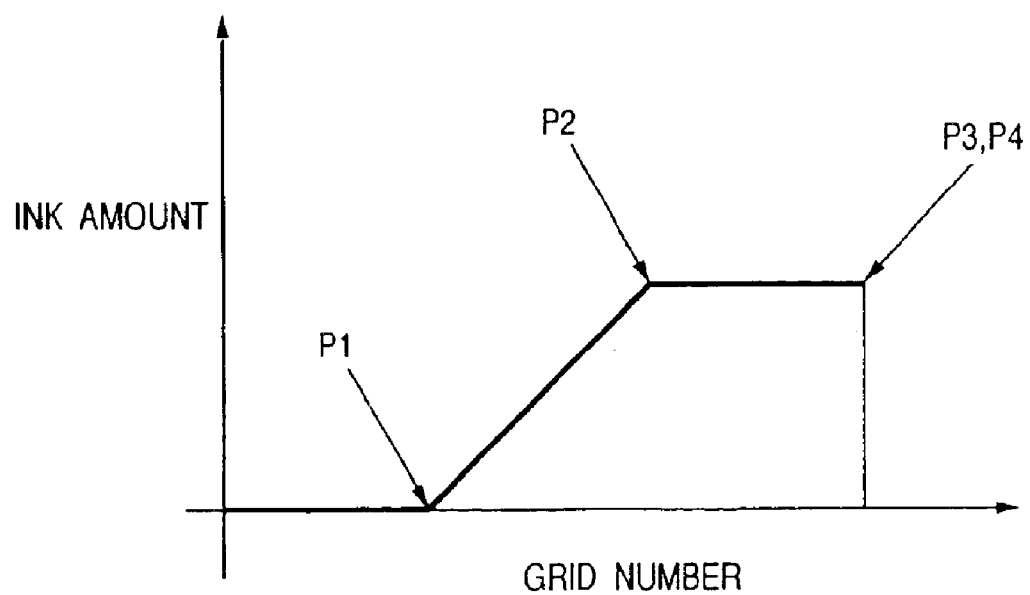
Figure 12A:
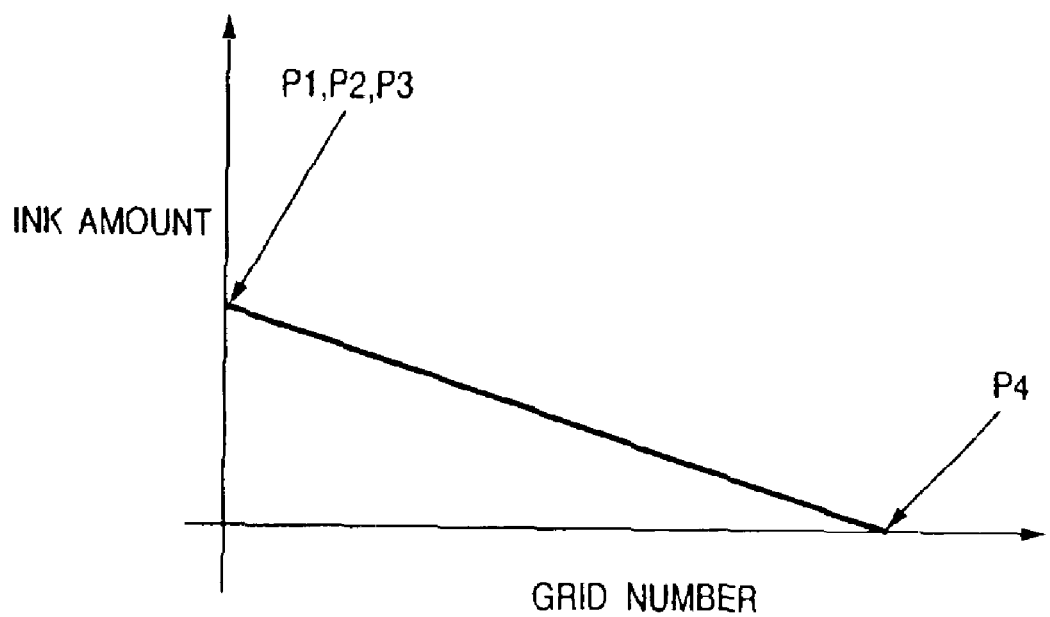
FIGS. 12A and 12B show setting examples of P1 to P4 when the shape is "monotone decrease"
Figure 12B:
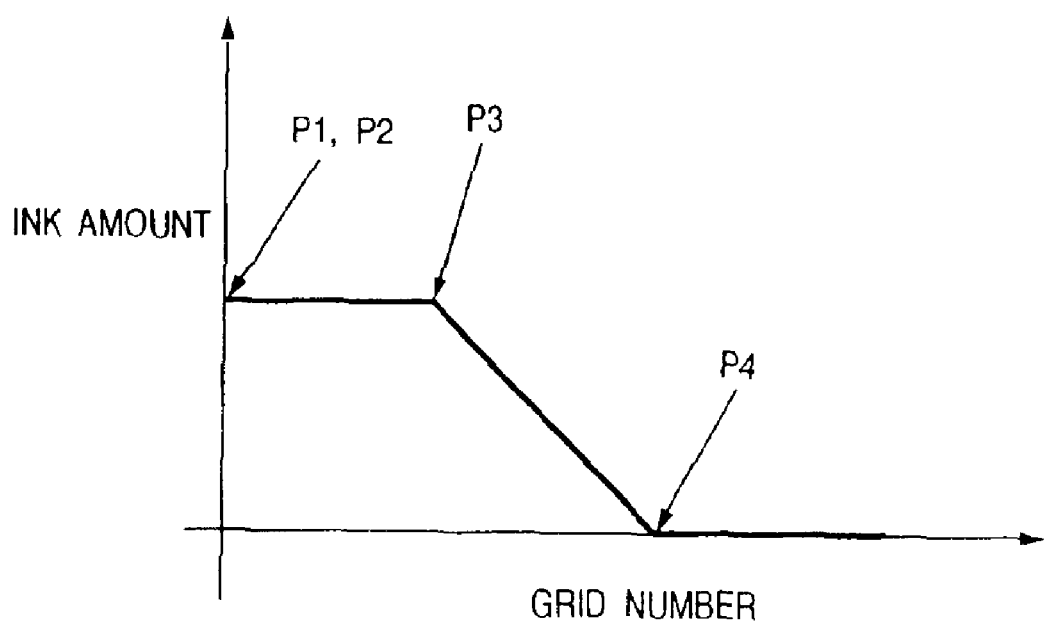
Figure 13A:
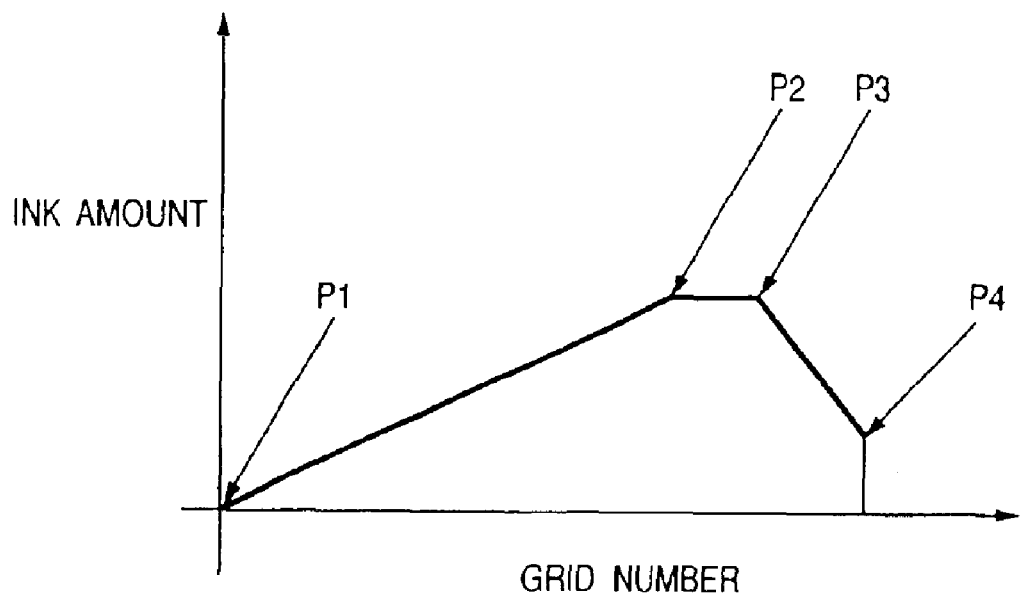
FIGS. 13A and 13B show setting examples of P1 to P4 when the shape is "misc"
Figure 13B:
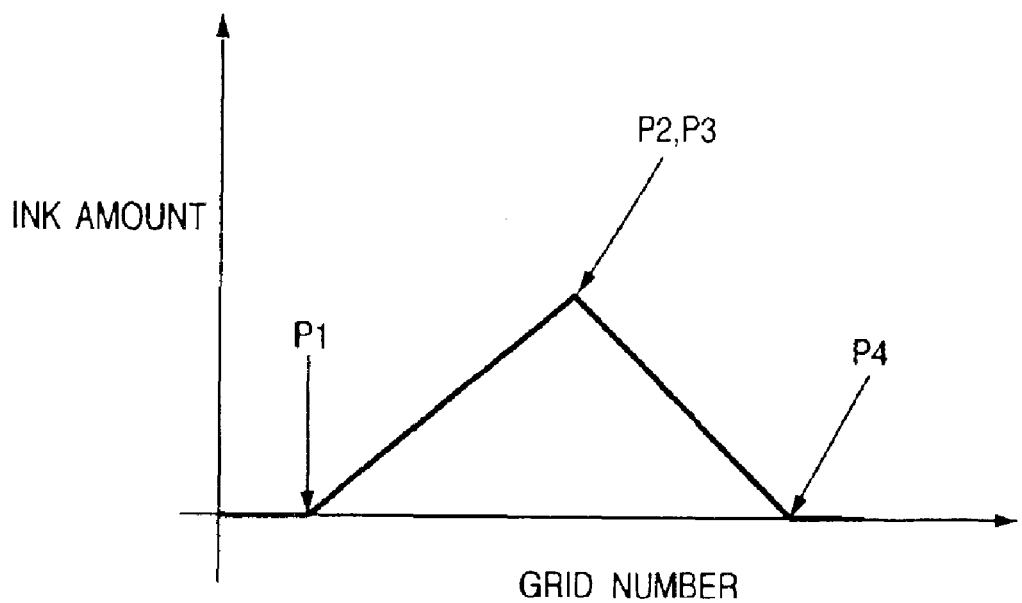

In step S21, a shape (to be referred to as an ink amount change shape or a side shape hereinafter) defined by an ink amount change curve according to transition of a color on each of the three sides of the triangle is determined. Note that the ink amount change shape is one of four shapes "constant", "monotone increase", "monotone decrease", and "upward convex". The ink amount change shape on each side is determined in a direction while fixing the start and end points of the triangle, as shown in FIG. 9. In each change shape, four control points P1 to P4 are set on each side. FIGS. 10A and 10B show an example of a side which has an ink amount change shape "constant". At this time, control points P1 and P2 are set at the left end, and control points P3 and P4 are set at the right end. Likewise, FIGS. 11A and 11B show an example of a shape "monotone increase". A control point P1 is set at the left end of a slope, a control point is set at the right end of the slope, and control points P3 and P4 are set at the right end. FIGS. 12A and 12B show an example of a shape "monotone decrease". Control points P1 and P2 are set at the left end, a control point P3 is set at the left end of a slope, and a control point P4 is set at the right end of the slope. FIGS. 13A and 13B show an example of a shape "misc" including "upward convex". A control point P1 is set at the left end of a slope, a control point P2 is set at the left end of a maximum value, a control point P3 is set at the right end of the maximum value, and a control point P4 is set at the right end of the slope.

In these shapes, the control points P1 to P4 set on each side respectively indicate a slope start point (i.e., an ink mixing start point), a maximum ink amount start point, a maximum ink amount end point, and a slope end point (i.e., an ink mixing end point) in accordance with a change in ink amount on the side. In this embodiment, an interpolation process to be described below is executed on the basis of these set control points P1 to P4.

Figure 15A:
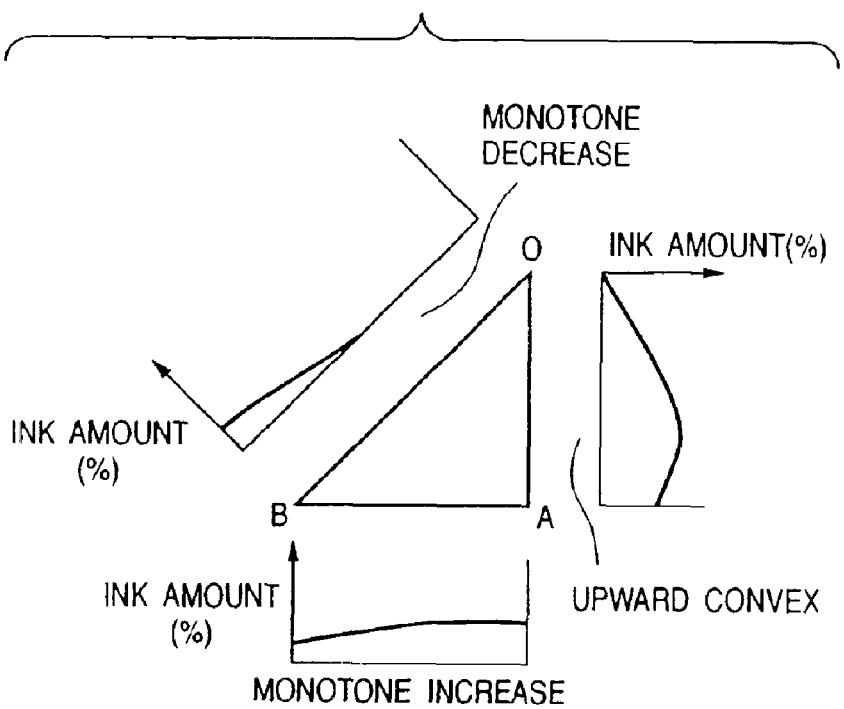
FIGS. 15A and 15B are views for explaining a triangle which has the same shape when it is inverted.
Figure 15B:
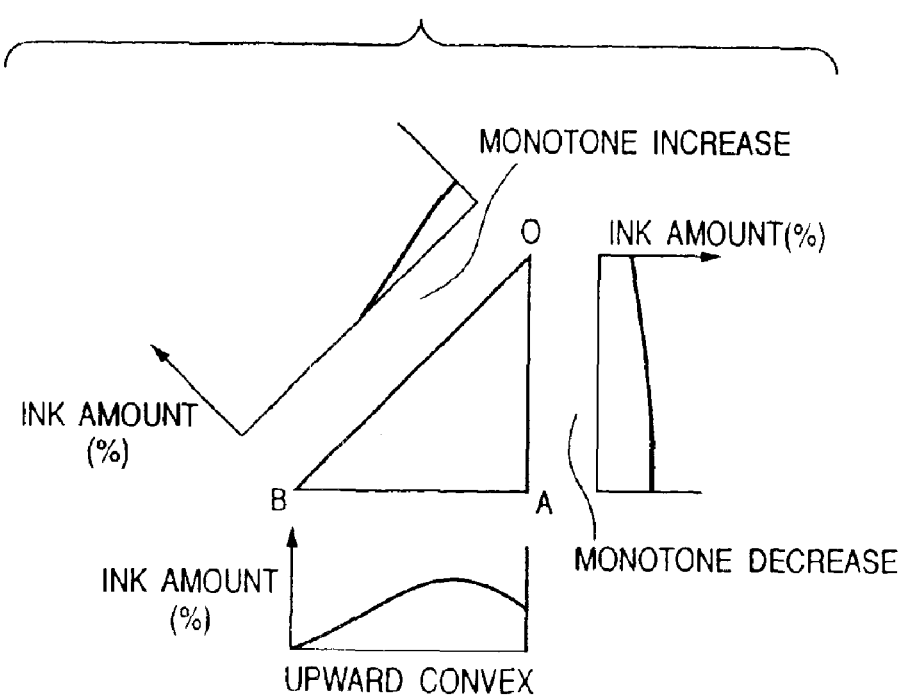
Figure 16A:
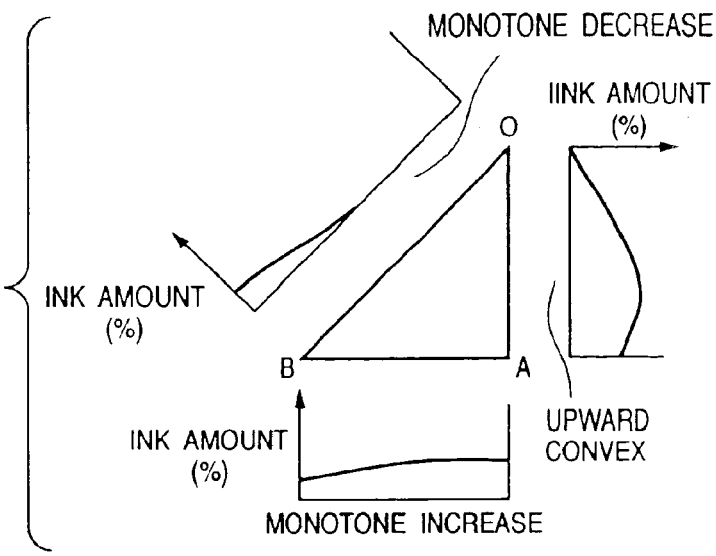
FIGS. 16A to 16C are views for explaining a triangle which has the same pattern when it is rotated.
Figure 16B:
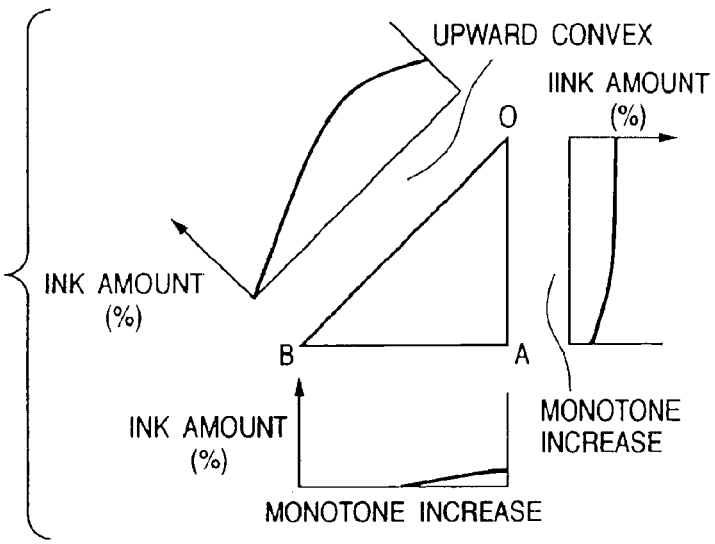
Figure 16C:
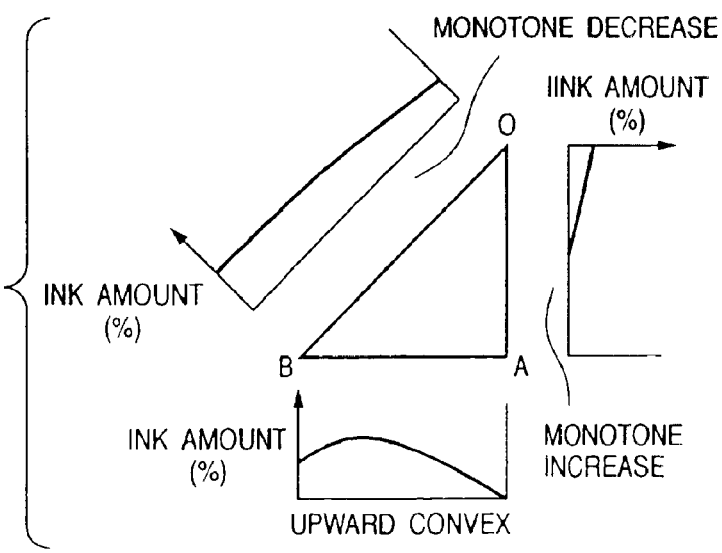

In step S22, an interpolation method for the triangle of interest is determined based on a combination of the ink amount change shapes of the respective sides determined in step S21. FIGS. 14A to 14D show the relationship between the combination of the ink amount change shape determination results of the respective sides and the interpolation methods. The types of interpolation methods are set in advance in blank fields of FIGS. 14A to 14D, and the interpolation method is determined based on FIGS. 14A to 14D. That is, tables shown in FIGS. 14A to 14D are prepared in correspondence with patterns of shapes of side AB. In each table, an interpolation method is designated for each combination of patterns of the shapes of sides AO and BO. Upon setting an interpolation method, when the same combination of the ink amount change shapes is obtained by inverting a triangle, as shown in FIGS. 15A and 15B or rotating a triangle, as show in FIG. 16A to 16C, an interpolation process is done using an identical interpolation method. As the interpolation method in this embodiment, five different interpolation methods I to V are available, as will be described later. In addition, interpolation is often skipped (in case of an impossible combination). The tables in FIGS. 14A to 14D are also held by the ink color separation table generator 104.

In step S23, the inner data of the triangle are calculated by interpolation on the basis of the interpolation method determined in step S22. Five different interpolation methods will be described in detail below using FIGS. 17A to 21C.

(Interpolation Method I)

Figure 17A:
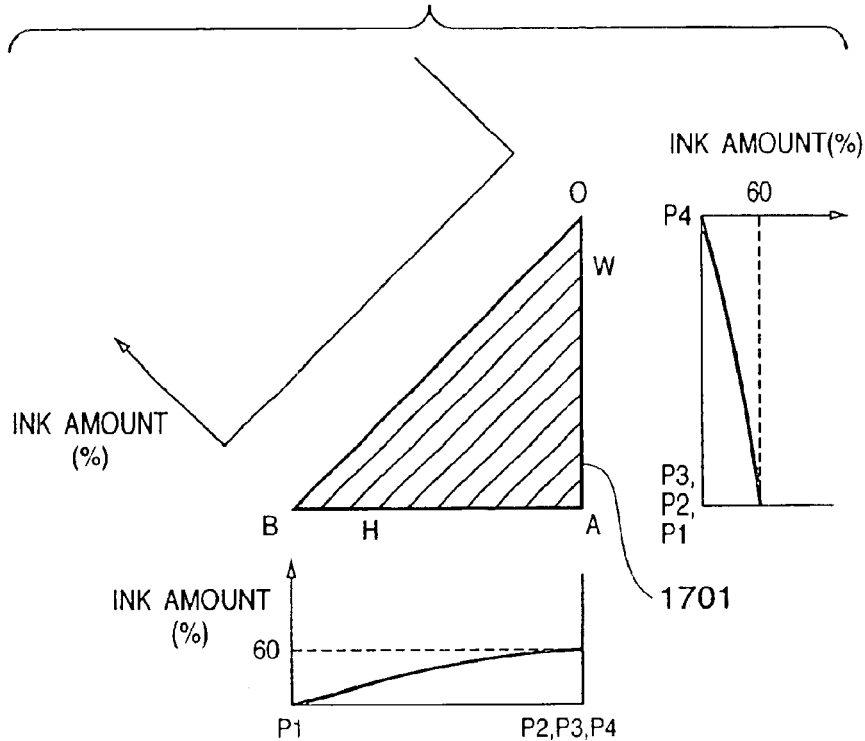
FIGS. 17A and 17B are views for explaining interpolation method I.
Figure 17B:
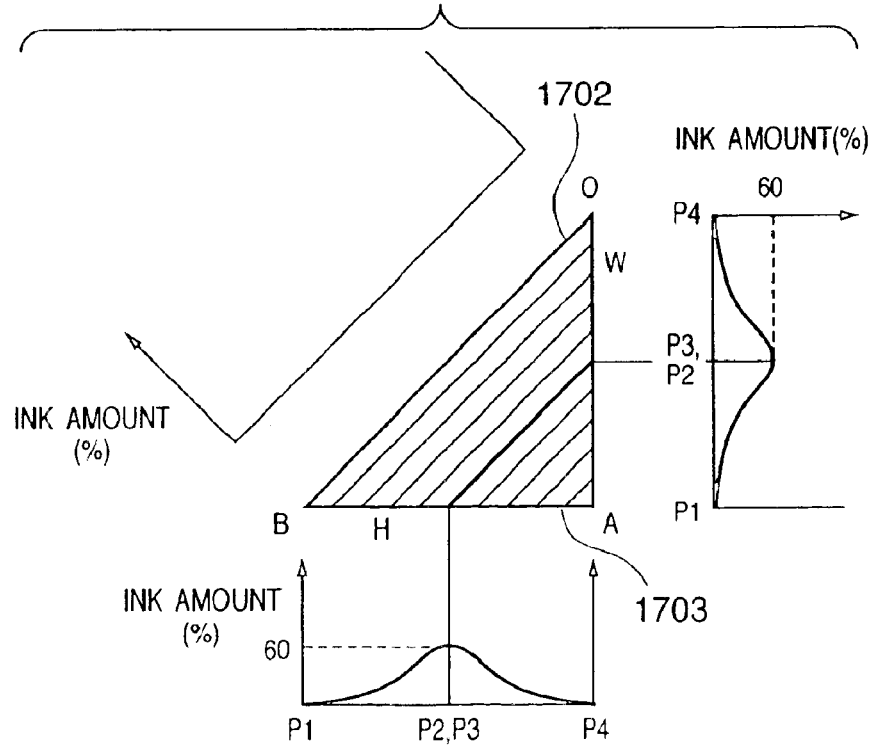

FIGS. 17A and 17B are views for explaining interpolation method I. Interpolation method I is suited to a case wherein corresponding ink amounts are present for only sides AO and BA, or a case wherein the ink amount of side BO is constant, and the ink amounts of sides AO and BA change (monotone decrease/increase, upward convex/upward convex). FIG. 17A shows a case wherein the ink amounts of both sides AO and BA monotonously decrease/increase, and FIG. 17B shows a case (upward convex) wherein the ink amounts of both sides AO and BA have maximum points in the middle of the sides. A description common to these cases will be given.

Points $P1_{BA}$ to $P4_{BA}$ on side BA are respectively connected to points $P1_{AO}$ to $P4_{AO}$ on side AO. Since points P1 to P4 are present on respective sides, the name of each side is appended to points P1 to P4 to discriminate these points. For example, $P1_{AO}$ indicates a point P1 on line segment AO in FIGS. 17A and 17B. According to ink amount changes on sides BA and AO shown in FIG. 17B, a trapezoidal region 1702 substantially defined by $P3_{AO}P2_{BA}$ and $P4_{AO}P1_{BA}$ (a triangular region 1701, as shown in FIG. 17A, if $P3_{AO}P2_{BA}$ and $P4_{AO}P1_{BA}$ indicate an identical position), and a triangular region 1703 defined by $P1_{AO}P4_{BA}$ and $P2_{AO}P3_{BA}$ appear in triangle ABO. Then, each region partitioned by such line segment (indicated by the bold line in FIG. 17B) undergoes an interpolation process.

For example, as for the regions 1701 (FIG. 17A) and 1702 (FIG. 17B) bounded by $P3_{AO}P2_{BA}$ and $P4_{AO}P1_{BA}$ in FIG. 17B, let W and H be arbitrary points on $P3_{AO}P4_{AO}$ and $P1_{BA}P2_{BA}$ that satisfy:

{(ink amount at point $P3_{AO}$)−(ink amount at point $P4_{AO}$)}:{(ink amount at point W)−(ink amount at point $P4_{AO}$)}={(ink amount at point $P2_{BA}$)−(ink amount at point $P1_{BA}$)}:{(ink amount at point H)−(ink amount at point $P1_{BA}$)}

Then, an ink amount at a point on line segment WH is calculated by linear interpolation based on ink amounts at points W and H. Determination of points W and H using the above proportional expression, and interpolation of the ink amount on line segment WH are performed for the region 1703 in the same manner as described above.

That is, the interpolation process using the above proportional expression will be more generally described below.

(1) For each of sides AO and BA, which has an ink amount change shape="upward convex", that side is divided into periods in which the ink amount changes monotonously. One of end points of each period is set as a start point, and the other is set as an end point.

(2) A difference between ink amounts at the start and end points of each period is calculated. This difference is calculated for each of sides AO and BA. When sides AO and BA are divided, the differences are calculated for corresponding periods, i.e., periods which define hypotenuses of a trapezoid, or periods which form sides that make the right angle of a right triangle. Let DAO be the difference calculated for side AO, and DBA be the difference calculated for side BA.

(3) Differences between ink amounts at points W and H on sides AO and BA and those at start points of the periods to which these points belong are calculated. Let these differences be DW and DH. Then, points W and H that meet DAB−DW=DBA−DH are calculated.

(4) Ink amounts at respective points (representative points) on line segment WH are calculated by linear interpolation on the basis of the ink amounts at points W and H.

In brief, points H and W having a ratio of the differences between the ink amounts at the start points on respective sides AO and BA of the triangular region and those at points H and W, which is equal to the ratio of the differences between the ink amounts at the start and end points of sides AO and BA, are determined, and ink amounts are calculated by interpolation based on line segment HW. The same interpolation process applies to other regions. The inner data of regions bounded by point A and $P1_{AO}$−$P4_{BA}$, $P1_{AO}$−$P4_{BA}$ and $P2_{AO}$−$P3_{BA}$, $P2_{AO}$−$P3_{BA}$ and $P3_{AO}$−$P2_{BA}$, $P3_{AO}$−$P2_{BA}$ and $P4_{AO}$−$P1_{BA}$, and $P4_{AO}$−$P1_{BA}$ and side BO are calculated by linear interpolation by setting arbitrary points H and W.

In case of FIG. 17A, since sides AO and BA have no maximum ink amount, no line (a line segment indicated by the bold line in FIG. 17B) that partitions triangle BAO into regions appears in that triangle and, hence, only one region of triangle BAO undergoes linear interpolation.

(Interpolation Method II)

Figure 18:
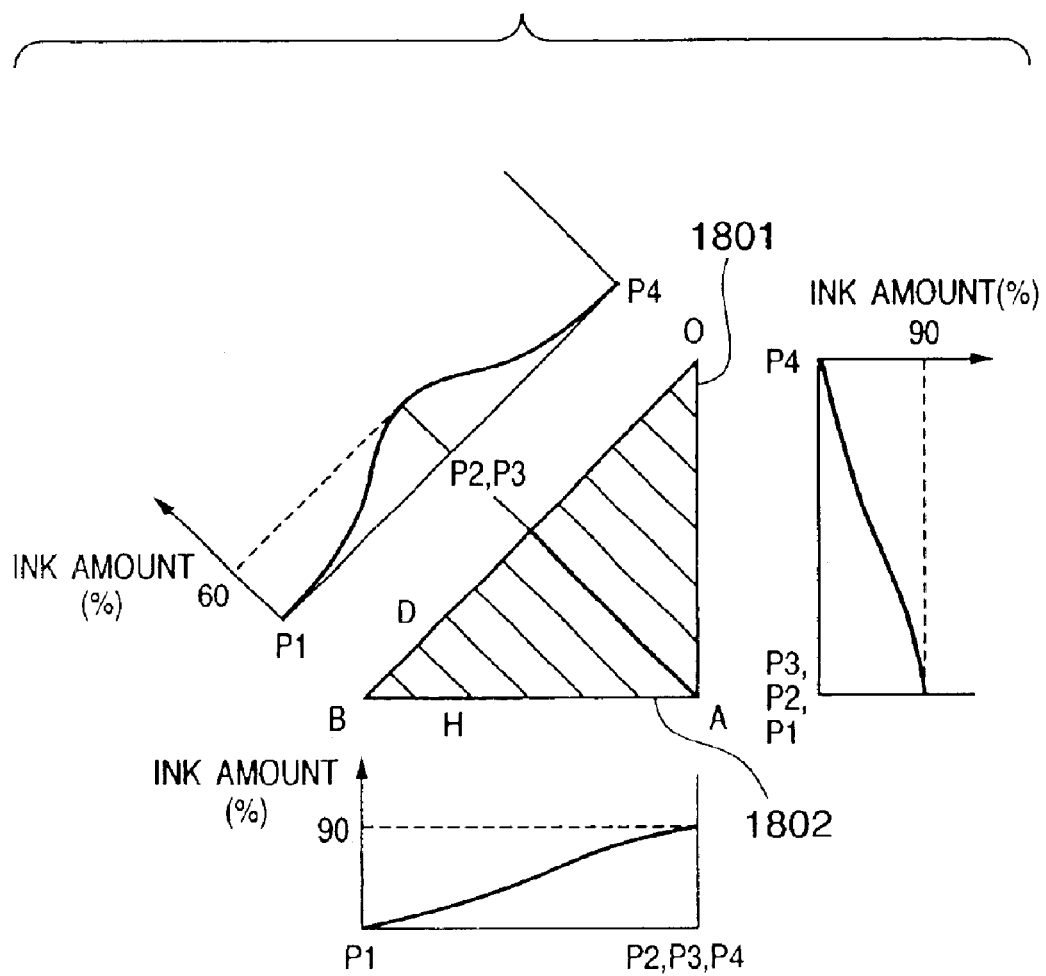
FIG. 18 is a view for explaining interpolation method II.

FIG. 18 is a view for explaining interpolation method II. Interpolation method II is suited to a case wherein corresponding ink amounts are given to all sides AO, BO, and BA of a triangle, sides AO and BA have monotone decrease/increase shapes, and side BO has an upward convex shape.

Points $P1_{BO}$ and $P1_{BA}$, $P2_{BO}$ and $P2_{BA}$, $P3_{BO}$ and $P3_{AO}$, $P4_{BO}$ and $P4_{AO}$, $P3_{BA}$ and $P2_{AO}$, and $P4_{BA}$ and $P1_{AO}$ of $P1_{AO}$ to $P4_{AO}$ on side AO, points $P1_{BO}$ to $P4_{BO}$ on side BO, and points $P1_{BA}$ to $P4_{BA}$ on side BA are respectively connected to each other.

For a region 1801 bounded by, e.g., line segments $P1_{BA}$−$P1_{BO}$ and $P2_{BA}$−$P2_{BO}$, let H and D be arbitrary points on $P1_{BA}$−$P2_{BA}$ and $P1_{BO}$−$P2_{BO}$, which satisfy:

{(ink amount at point $P2_{BA}$)−(ink amount at point $P1_{BA}$)}:{(ink amount at point W)−(ink amount at point $P1_{BA}$)}={(ink amount at point $P2_{BO}$)−(ink amount at point $P1_{BO}$)}:{(ink amount at point D)−(ink amount at point $P1_{BO}$)}

Then, ink amounts at points on line segment HD are calculated by linear interpolation based on ink amounts at points H and D. That is, points H and D with ink amounts which have equal ratios to the differences between ink amounts at start points ($P1_{BA}$, $P1_{BO}$) and end points ($P2_{BA}$, $P2_{BO}$) on neighboring sides (BA and BO in this case) in the region are determined on these sides, and ink amounts are calculated by interpolation based on line segment HD.

The same applies to a triangular region 1802 in FIG. 18.

As for triangles bounded by $P2_{BO}$–$P2_{BA}$–$P3_{BA}$ and $P3_{BO}$–$P3_{AO}$–$P2_{AO}$, for example, in case of the former triangle, $P2_{BO}$ and an arbitrary point on side $P2_{BA}$–$P3_{BA}$ are connected via a straight line, and ink amounts at points on that straight line are calculated by linear interpolation based on the ink amounts at its two end points.

(Interpolation Method III)

Figure 19:
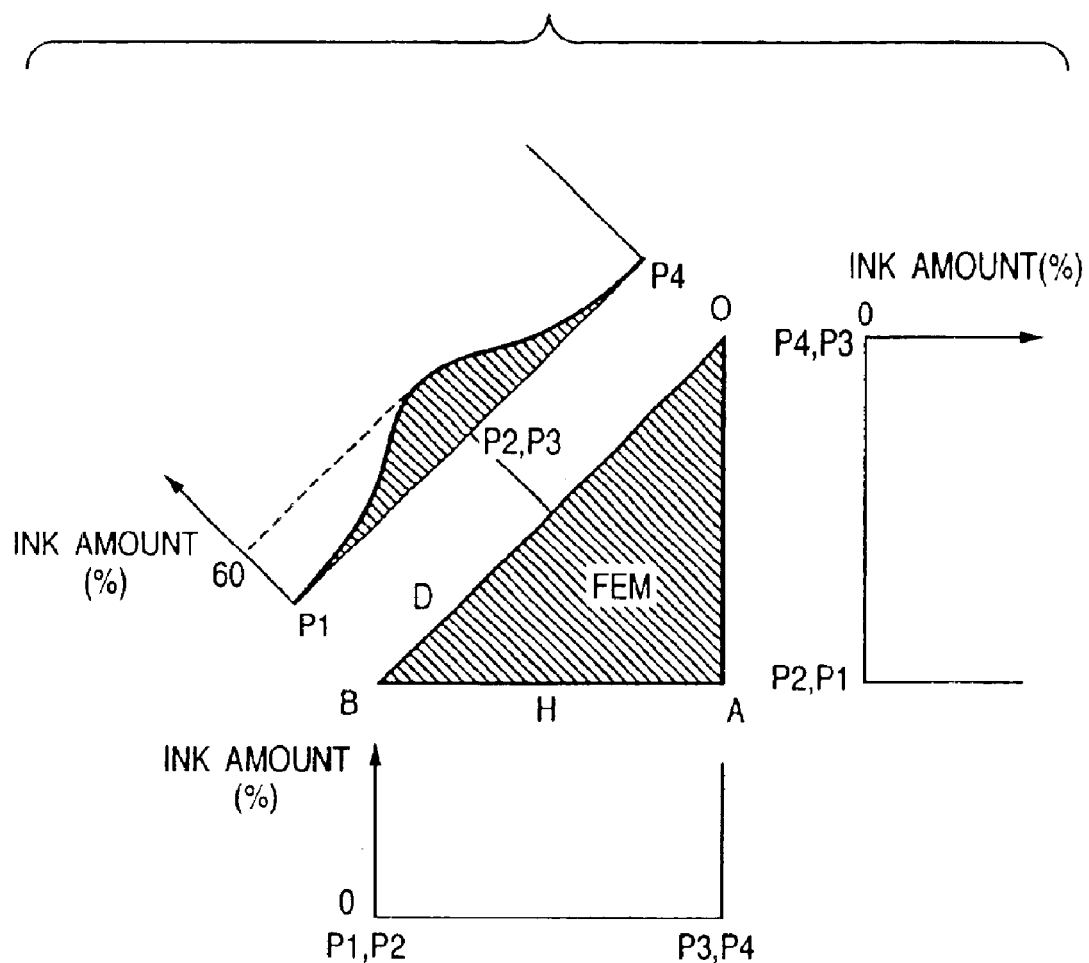
FIG. 19 is a view for explaining interpolation method III.

FIG. 19 is a view for explaining interpolation method III. Interpolation method III is suited to a case wherein corresponding ink amounts are given to only side BO, sides AO and BA have constant shapes, and side BO has an upward convex shape, and so forth.

In such case, there are no control points which have one-to-one correspondence unlike in interpolation methods I and II. Hence, a two-dimensional nonlinear interpolation process is executed based on an interpolation method called a finite element method (FEM). In the finite element method (FEM), if boundary conditions on a closed space are given, inner values are calculated by solving a partial differential equation based on the boundary conditions. In this case, as the boundary conditions, since constant ink amounts are given to sides AO and BA, and ink amounts that form an upward convex shape are given to side BO, ink amounts inside the space are calculated. The finite element method itself is a state-of-the-art technique as a numerical solution.

(Interpolation Method IV)

Figure 20A:
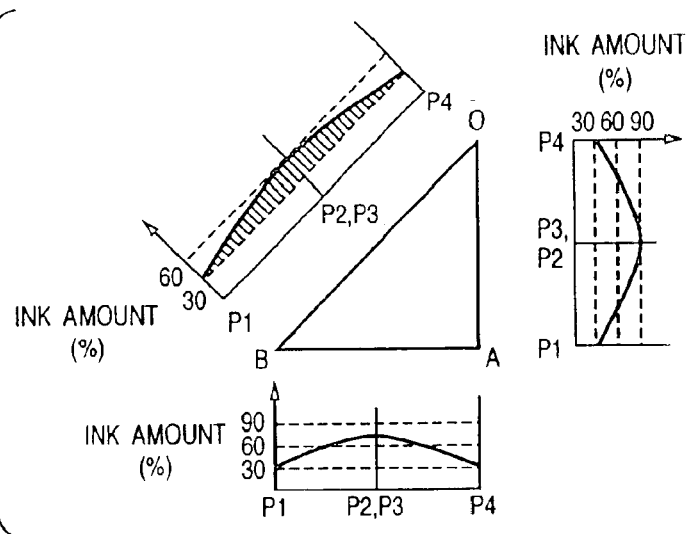
FIGS. 20A to 20C are views for explaining interpolation method IV.
Figure 20B:
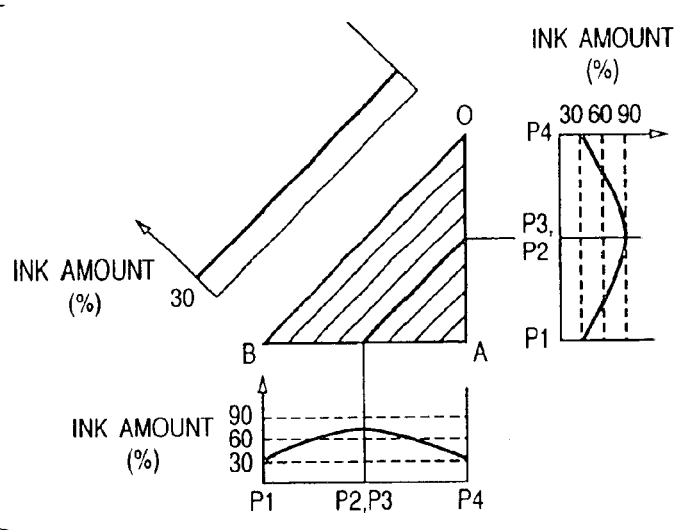
Figure 20C:
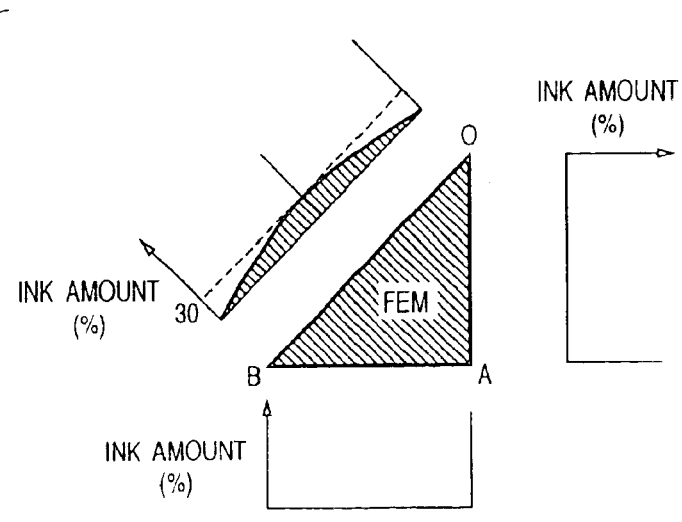

FIGS. 20A to 20C are views for explaining interpolation method IV. Interpolation method IV is suited to a case wherein corresponding ink amounts are given to all sides AO, BO, and BA of a triangle, and all sides AO, BO, and BA have upward convex shapes of ink amounts, and the like.

In such case, ink amounts at peaks of the upward convex shapes of the three sides are compared, and interpolation of the inner data of triangle OAB is implemented by using a two-point interpolation method of interpolation method I and an interpolation method using the finite element method (FEM) of interpolation method III together depending on the ink amounts. In the example of FIG. 20A, the ink amount of $P2_{AO}$> the ink amount of $P2_{BA}$> the ink amount of $P2_{BO}$. For this reason, using two sides AO and BA having larger ink amounts at their peaks, an interpolation process is done based on two-point interpolation of interpolation method I, as shown in FIG. 20B. Let E(i) be the interpolation process result at that time. Note that i is a suffix indicating a grid point of interest. Ink amounts of only an upward convex shape portion of side BO (a portion on the upward convex side of a line that connects $P1_{BO}$ and $P4_{BO}$) undergo an interpolation process using the finite element method (FEM) of interpolation method III, as shown in FIG. 20C. Let FEM(i) be the interpolation process result at that time. Then, an interpolation process result D(i) of the shape shown in FIG. 20A is given by:

$$D(i)=E(i)+FEM(i)$$

When all the three sides have upward convex shapes, corresponding two sides are set, and a two-point interpolation process is done in the conventional method. With this method, information of the remaining one side is not reflected, and continuity between the ink amounts on that side and those at inner grids is lost, thus generating a pseudo edge in a reproduced image. However, using this interpolation method IV, a two-dimensional interpolation process that reflects all pieces of information of all the three sides can be realized, thus reproducing an image in which continuity of ink amounts is preserved and the gray balance have improved.

(Interpolation Method V)

Figure 21A:
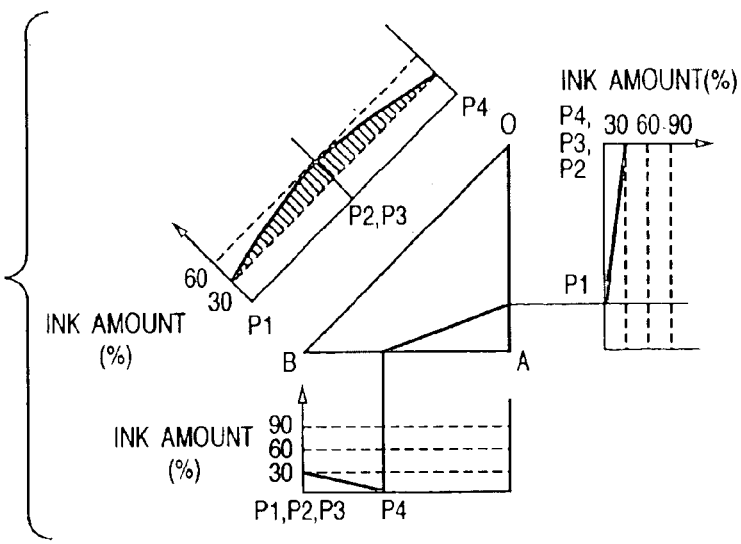
FIGS. 21A to 21C are views for explaining interpolation method V.
Figure 21B:
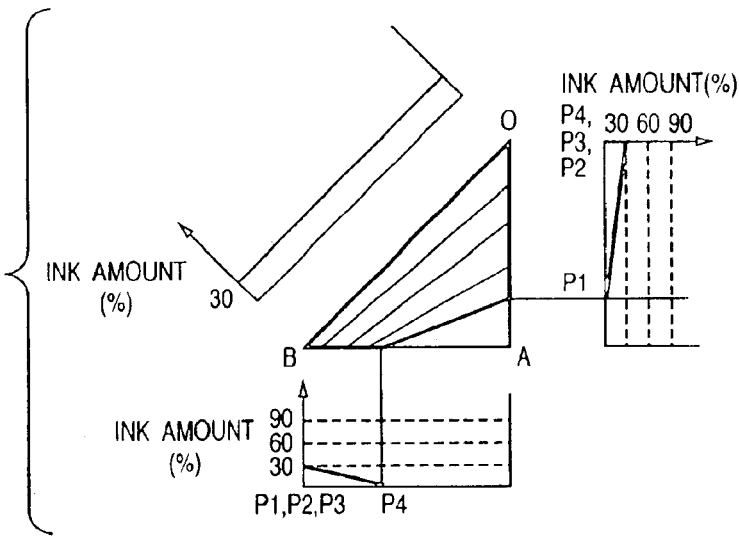
Figure 21C:
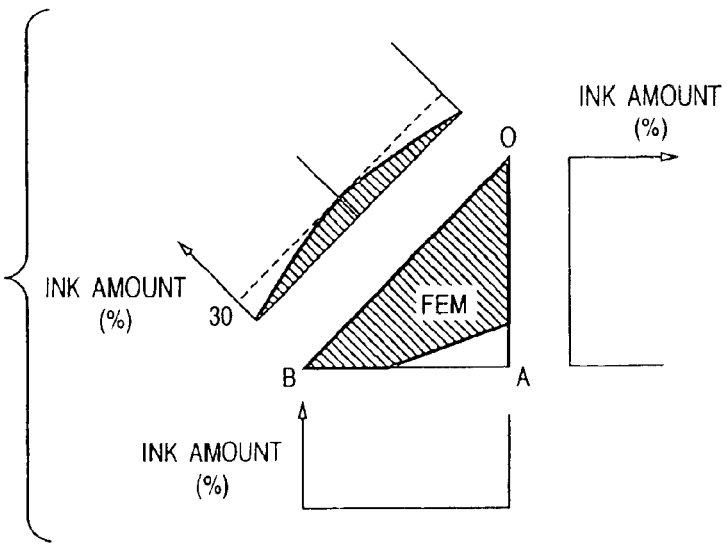

FIGS. 21A to 21C are views for explaining interpolation method V. Interpolation method V is suited to a case wherein corresponding ink amounts are given to all sides AO, BO, and BA of a triangle, side AO has a monotone increase shape, side BO has an upward convex shape, and side BA has a monotone decrease shape, and the like.

In such case, interpolation of the inner data of triangle OAB is implemented by using a two-point interpolation method of interpolation method I and an interpolation method using the finite element method (FEM) for a limited region together as in interpolation method IV.

In the example of FIG. 21A, an ink amount is generated from the middle of side AO, and becomes zero from the middle of side BA. FIG. 21B shows ink amounts defined by sides AO and BA and that defined by connecting $P1_{BO}$ and $P4_{BO}$ of side BO in FIG. 21A via a line, and they undergo an interpolation process using interpolation method I. Let E(i) be the interpolation process result at that time.

In FIG. 21C, only a region where an ink amount is present in FIG. 21B (a region bounded by the bold lines in FIG. 21B) undergoes an interpolation process by the finite element method (FEM). In this case, the boundary condition of side OB is an ink amount of only an upward convex shape portion of side BO in FIG. 21A (a portion on the upward convex side of a line that connects $P1_{BO}$ and $P4_{BO}$), and other boundary conditions are zero. Let FEM(i) be the interpolation process result of that finite element method (FEM).

An interpolation result D(i) of the shape shown in FIG. 21A is calculated, as in interpolation method IV, by:

$$D(i)=E(i)+FEM(i)$$

In this way, when only one side has an upward convex shape, and other sides have monotone decrease or increase shapes, corresponding two sides are set, and an interpolation process is done between two points to calculate an ink amount in the conventional method. With this method, information of one side is not reflected, and continuity between the ink amounts on that side and those at inner grids is lost, thus generating a pseudo edge in a reproduced image. However, using this interpolation method V, a two-dimensional interpolation process that reflects all pieces of information of all the three sides can be realized, thus reproducing an image in which continuity of ink amounts is preserved and the gray balance have improved.

(Actual Interpolation Example)

Figure 22:
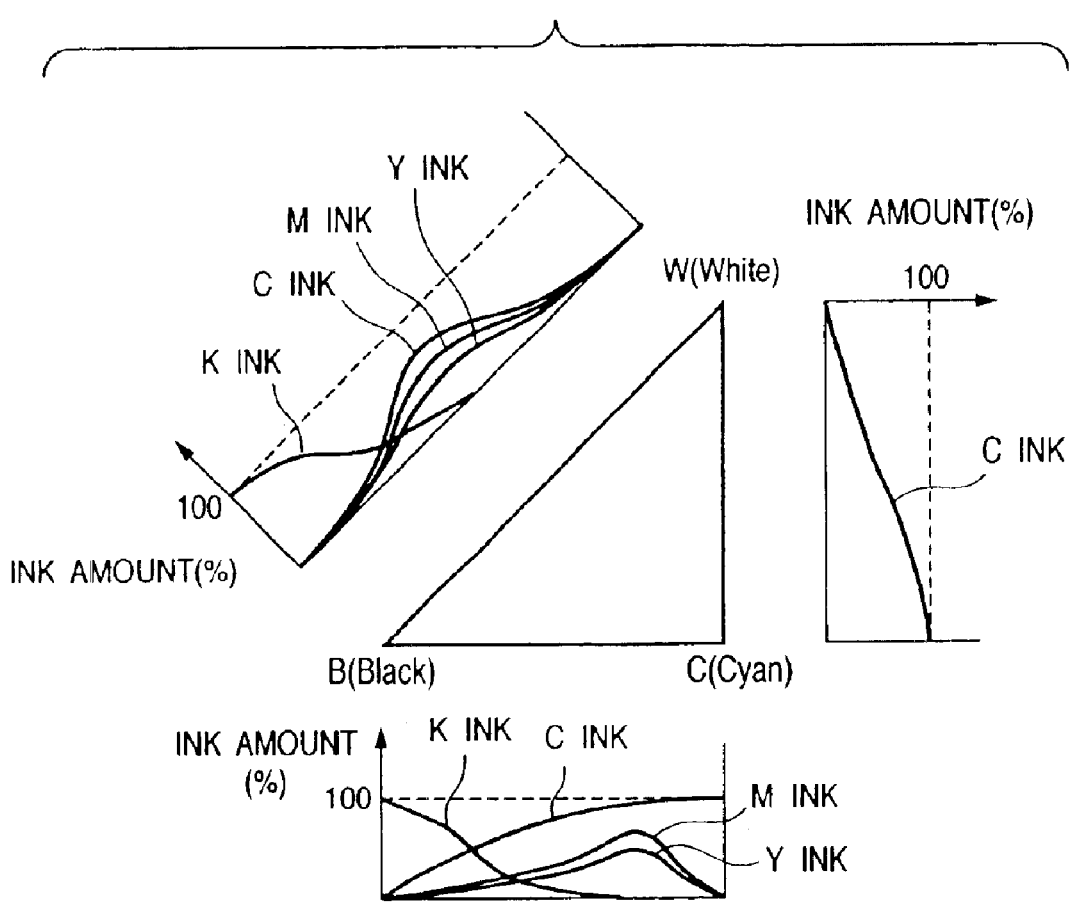
FIG. 22 shows ink amount change examples on the respective sides of a triangle having Black, White, and Cyan as vertices.

FIG. 22 shows changes in C, M, Y, and Bk ink amounts for respective sides of a triangle specified by black (Bk), white (W), and cyan (C). In this case, C ink changes in a monotone decrease/increase shape for sides CW and BC, and in an upward convex shape for side BW. For this reason, C ink undergoes interpolation by interpolation method II. As for other M, Y, and K inks, since ink amount values are given to only sides BC and BW, they undergo interpolation by interpolation method I. In this way, ink amounts of respective color components at grid points inside the triangle can be calculated.

As described above, using the color separation table generated by the interpolation method of this embodiment, appropriate color separation can be achieved. For example, in FIGS. 17A and 17B (interpolation method I), the method of mixing inks on a line segment which is perpendicular to line segment WH can be controlled by the positions of points P1$_{BA}$ and P1$_{AO}$. That is, the method of mixing inks by line segment P1$_{BA}$P1$_{AO}$ can be controlled by that on the two sides. More specifically, when the color separation table is set to smoothly mix inks from points P1$_{BA}$ and P1$_{AO}$ on sides BA and AO, ink can also be smoothly mixed on a line segment which is perpendicular to line segment WH.

Furthermore, inks are controlled not to be mixed into a region bounded by line segment P1$_{BA}$P1$_{AO}$ and B. For this reason, the ink amount of black ink is zero in a region where the black-mixing point is not reached, and granularity of an image caused by black (K ink) can be reduced.

When ink amounts on the odd number of sides (one or three sides) change in an upward convex shape, the conventional ink separation table generation method does not reflect ink amount change information of the upward convex shape of one side. As a result, continuity between the ink amounts on that side and those at inner grids is lost, thus generating a pseudo edge in a reproduced image. However, the ink color separation table generation method according to the present invention can solve such problem. That is, when changes in ink amount on three sides are given, an ink color separation table can be generated by executing a two-dimensional interpolation process that reflects all pieces of information. For this reason, an RGB image is converted into ink colors using this ink color separation table, and the converted image data undergoes a pseudo halftone process upon printing, thus reproducing an image in which continuity of ink amounts is preserved and the gray balance have improved.

When the shapes of changes in ink amount on respective sides (i.e., on the corresponding color separation table) are classified, two sides are selected from the three sides based on a combination of classes of ink amounts on the three sides, and an interpolation process of the inner data of the triangle is done by a linear interpolation process on the basis of the ink amounts of the two selected sides, information of one side is not used depending on the combination of the classes of the shapes of the three sides. In this case, continuity between the ink amounts on one side which is not used and those at inner grids which contact that line is lost, thus generating a pseudo edge in a reproduced image. According to the method of this embodiment, however, since an interpolation process is done using all pieces of information of three sides, a pseudo edge can be prevented from being generated in a reproduced image.

The interpolation method of the present invention gives representative points which specify a range of the input color space as W, Y, M, C, R, G, B, and Bk, determines color separation data at these representative points in advance, and then executes interpolation for each of triangles by interpolation on the basis of the color separation data at the representative points while recognizing the range of the input color space as a set of triangles. Upon decomposing into triangles, in order to prevent duplication or omission, and to simplify the process, appropriate lines (seven lines W-Bk and W-YMCRGB-Bk in this embodiment) that connect respective vertices undergo interpolation first. Then, the space is divided into tetrahedrons having these lines as ridges, each tetrahedron is recognized as a set of triangles parallel to one plane, and each triangle undergoes interpolation.

<Modification 1>

The present invention is not limited to the above embodiment, and various modifications may be made. Such modification will be explained below.

The above embodiment has proposed methods that combine two-point interpolation and the finite element method (FEM) as interpolation methods IV and V. In these methods, let E(i) be the interpolation process result of two-point interpolation, FEM(i) be the interpolation process result of the finite element method (FEM), and D(i) be the final interpolation process result. Then, D(i) is calculated by:

$$D(i)=E(i)+FEM(i)$$

In this modification 1, parameter α that controls the strength of FEM is set to modify this equation as:

$$D(i)=E(i)+\alpha \times FEM(i)$$

By setting this value α for each region, the ink amount can be freely controlled. In this way, nonlinear characteristics caused by ink and media (paper) characteristics can be absorbed for each region, thus suppressing a pseudo edge of a reproduced image.

Figure 24:
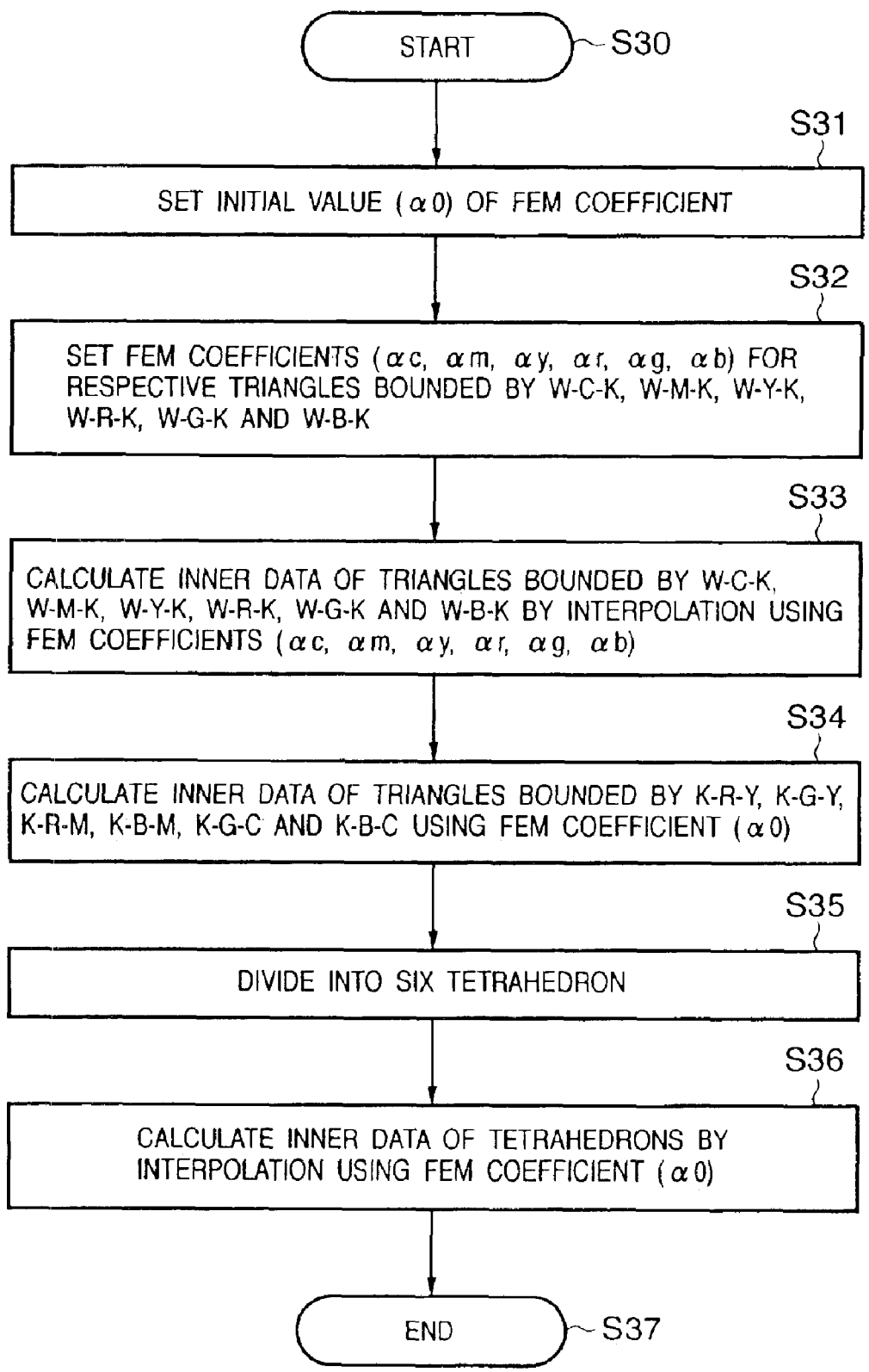
FIG. 24 is a flow chart that implements interpolation based on a finite element method (FEM) by setting FEM coefficients for respective regions.

FIG. 24 shows an example of a practical flow chart of that process. Referring to FIG. 24, step S30 is a start step. In step S31, an initial value (α0) of an FEM coefficient is set. In step S32, FEM coefficients (αc, αm, αy, αr, αg, αb) for respective triangles bounded by W-C-Bk, W-M-Bk, W-Y-Bk, W-R-Bk, W-G-Bk, and W-B-Bk (they will be expressed as W-CMYRGB-Bk together hereinafter) are set. That is, the FEM coefficients can be freely set for respective hue levels. In step S33, the inner data of respective triangles bounded by W-CMYRGB-Bk are calculated using the FEM coefficients (αc, αm, αy, αr, αg, αb). In step S34, inner data of triangles bounded by Bk-R-Y, Bk-G-Y, Bk-R-M, Bk-B-M, Bk-G-C, and Bk-B-C are calculated by an interpolation process using the FEM coefficient (α0). In step S35, the space is divided into six tetrahedrons. In step S36, inner data of respective tetrahedrons are calculated by an interpolation process using the FEM coefficient (α0).

In this modification, FEM coefficients are set for respective color components C, M, Y, R, G, and B. However, the control parameters are not limited to such specific parameters, but may be freely set for respective highlight/shadow regions and the like.

<Modification 2>

In the above embodiment, four colors C, M, Y, and Bk have been exemplified as the ink colors of the printer. Also, for a six-color printer which uses a total of six color inks, i.e., light and dark cyan and magenta inks in addition to Y and Bk, the same interpolation process as in the above embodiment can be easily implemented by only increasing ink colors by two. In this case, a dark ink-mixing start point setting UI is newly added on the monitor 1402 in FIG. 2 as in the black (K ink) mixing point setting UI, and a total of seven dark cyan and magenta mixing points are set on lines W-Bk, C-Bk, M-Bk, Y-Bk, R-Bk, G-Bk, and B-Bk in the same manner as black-mixing points. In this way, dark ink mixing points can be three-dimensionally and continuously controlled.

Figure 23:
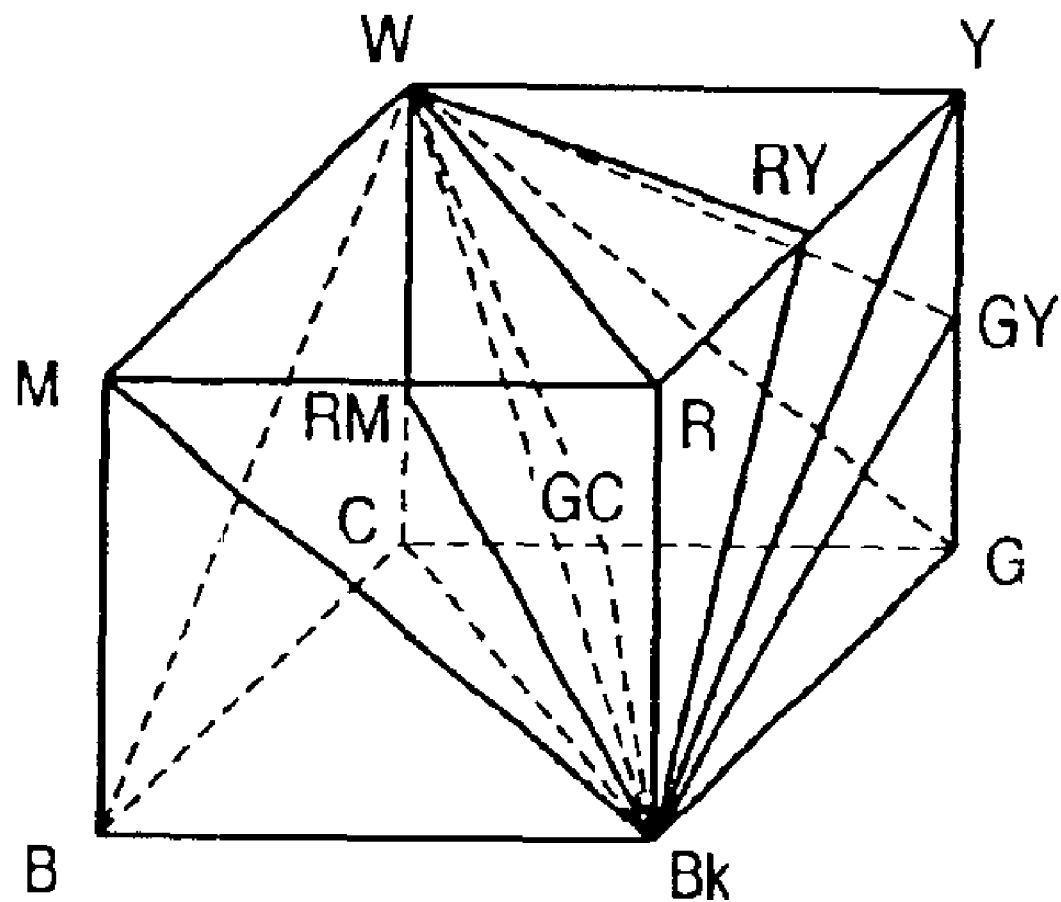
FIG. 23 is a view for explaining color space division in a six-color printer using C, M, Y, Bk, R, and G inks.

In case of a six-color printer which has color inks such as red (R), green (G), and the like other than C, M, Y, and Bk, RM is newly set at the middle point between R and M; RY between R and Y; GY between G and Y; and GC between G and C, as shown in FIG. 23. Then, by defining 10 tetrahedrons (W, C, B, and Bk; W, B, M, and Bk; W, M, RM, and Bk; W, RM, R, and Bk; W, R, RY, and Bk; W, RY, Y, and Bk; W, Y, GY, and Bk; W, GY, G, and Bk; W, G, GC, and BK; and W, GC, C, and Bk), optimal ink color separation for the six-color printer can be provided.

In this manner, according to this modification, even when light inks or other color inks such as red, green, and the like are used in addition to C, M, Y, and K inks, an optimal color separation table can be provided.

<Modification 3>

In the above embodiment, the ink color separation table generated by the computer is downloaded to the printer, and the controller in that printer executes a color separation process. However, the present invention is not limited to this, and may be similarly applied to a case wherein the generated ink color separation table is set in an LUT in a printer driver in the computer 1401 shown in FIG. 2.

<Modification 4>

In the above embodiment, the computer 1401 shown in FIG. 2 has been exemplified as an apparatus for outputting image data to the printer. However, the present invention is not limited to such specific apparatus, but may be applied to any other apparatuses which can temporarily store image data sensed by, e.g., a digital camera, and can transmit that image data to a printer connected to that apparatus, as long as they can transmit image data to the printer.

In the above embodiment, the apparatus (computer 1401) which transmits image data and the printer are separately present. Also, when image data input by input means such as a digital camera or the like is stored in an arbitrary memory medium, and the printer main body has an arrangement that can load the memory medium, the present invention can be practiced in only the printer main body.

<Modification 5>

In the above embodiment, the colorimeter is used as a patch sample input device, as shown in FIG. 2. However, the present invention is not limited to such specific device, but may be applied to any other devices such as a flatbed scanner, drum scanner, and the like, as long as they can fetch printouts as data into a computer and can inspect the ink characteristics of the printer.

<Modification 6>

In the above embodiment, the RGB color space has been exemplified as the input color space of the ink color separation table that specifies the color gamut of the color printer. However, of course, the input color space is not limited to the RGB color space, and the present invention can be applied to any other color spaces such as CMY, abc, and the like, as long as the color gamut of the printer can be three-dimensionally specified by three variables.

<Modification 7>

In the above embodiment, in the interpolation process of inner data of each triangle, the ink amount change shapes on each side of that triangle are classified to four shapes, i.e., "constant", "monotone increase", "monotone decrease", and "upward convex". Also, other shapes such as a peak shape, saw-tooth shape, and the like may be added. In the above embodiment, four points P1 to P4 are designated on respective sides for delimiters of interpolation. However, the number of points is not limited to four.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As described above, according to the present invention, since an interpolation process result of a two-point interpolation process based on two sides of a triangular plane, and nonlinear interpolation based on the finite element method (FEM) are used together, the conventional problem (when the color separation tables of the three sides have complicated shapes, it is difficult to calculate contour lines, and solutions cannot be obtained in some cases) can be solved.

Also, interpolation that always reflects the ink amounts on the three sides to preserve continuity can be implemented. Hence, a pseudo edge which is generated at a boundary of a side whose information is not used in the conventional method can be prevented.

As many apparently widely different embodiments of the present invention can be made without departing from the spirit and scope thereof, it is to be understood that the invention is not limited to the specific embodiments thereof except as defined in the appended claims.

What is claimed is:

1. A color separation table generation method of generating a color separation table used to separate an input color into a plurality of color agent colors, comprising:
   a first table generation step of generating color separation data on a first line that connects white and black points in the color separation table;
   a second table generation step of generating color separation data on a plurality of second lines each of which connects the white point and each of primary color points each expressed by one of the color agent colors and secondary color points each expressed by two of the color agent colors;
   a third table generation step of generating color separation data on a plurality of third lines each of which connects each of the primary and secondary color points and the black point;
   a fourth table generation step of generating color separation data on a plurality of fourth lines each of which connects the primary and secondary color points; and
   an interpolation step of generating color separation data at grid points inside a three-dimensional color space by an interpolation process based on the color separation data on the first to fourth lines,
   wherein the interpolation step includes a step of executing an interpolation process using a finite element method for each triangular plane specified on the color space.

2. The method according to claim 1, wherein the interpolation step includes a step of executing an addition process of an interpolation result of a two-point interpolation process based on two sides of the triangular plane, and an interpolation result of the finite element method.

3. The method according to claim 1, wherein the finite element method in the interpolation step executes an interpolation process based on a change in color agent amount on one side of the triangular plane.

4. The method according to claim 3, wherein the finite element method in the interpolation step executes an interpolation process based on a partial change in color agent amount on one side of the triangular plane.

5. The method according to claim 2, wherein the finite element method in the interpolation step applies a finite element method interpolation method exclusively for a region where color agent amounts are present as a result of the two-point interpolation process based on the two sides of the triangular plane.

6. The method according to claim 1, wherein the interpolation step includes a step of controlling interpolation result values based on the finite element method for respective regions.

7. The method according to claim 1, wherein the interpolation step includes a step of classifying changes in color agent amount on respective sides of the triangular plane into a plurality of shapes, setting an interpolation method on the basis of a combination of the shapes of the sides of the triangular plane, generating color separation data for grid points on the triangular plane by the set interpolation method, and setting an identical interpolation method when the same shape is obtained by inverting, rotating, or inverting and rotating the sides of the triangular plane.

8. An image forming apparatus for forming an image using a plurality of color agents, comprising:
   an input unit for inputting color image data;
   a color separation unit for separating each of colors indicated by the input color image data into the plurality of color agent colors on the basis of a color separation table generation by a method of claim 1; and
   an image forming unit for forming a visible image on the basis of the color image data separated into the plurality of color agent colors.

9. A color separation table generation method of generating a color separation table used to separate an input color into a plurality of color agent colors, comprising:
   a step of decomposing, into a set of triangles, a space of an input color range specified by prescribed points which specify outer edges of the input color range on a color space of the input color on the basis of color separation data at the prescribed points; and
   a step of calculating color separation data corresponding to the color space for the entire range of the input color by interpolating inner color separation data of each of the triangles,
   wherein upon interpolating each triangle, when transition of a color separation data value forms an upward convex shape for one or three sides of the triangle, interpolation is made by a finite element method using the side whose transition of the color separation data value forms an upward convex shape for one side, and a constant for the remaining two sides as boundary values.

10. A computer program product that records a program for generating a color separation table used to separate an input color into a plurality of color agent colors, said program comprising:
    a code of a first table generation step of generating color separation data on a first line that connects white and black points in the color separation table;
    a code of a second table generation step of generating color separation data on a plurality of second lines each of which connects the white point and each of primary color points each expressed by one of the color agent colors and secondary color points each expressed by two of the color agent colors;
    a code of a third table generation step of generating color separation data on a plurality of third lines each of which connects each of the primary and secondary color points and the black point;
    a code of a fourth table generation step of generating color separation data on a plurality of fourth lines each of which connects the primary and secondary color points; and
    a code of an interpolation step of generating color separation data at grid points inside a three-dimensional color space by an interpolation process based on the color separation data on the first to fourth lines,
    wherein the interpolation step includes a step of executing an interpolation process using a finite element method for each triangular plane specified on the color space.

11. A computer program product that records a program for generating a color separation table used to separate an input color into a plurality of color agent colors, said program comprising:
    a code of a step of decomposing, into a set of triangles, a space of an input color range specified by prescribed points which specify outer edges of the input color range on a color space of the input color on the basis of color separation data at the prescribed points; and
    a code of a step of calculating color separation data corresponding to the color space for the entire range of the input color by interpolating inner color separation data of each of the triangles, wherein upon interpolating each triangle, when transition of a color separation data value forms an upward convex shape for one or three sides of the triangle, interpolation is made by a finite element method using the side whose transition of the color separation data value forms an upward convex shape for one side, and a constant for the remaining two sides as boundary values.

12. A color separation table generation apparatus for generating a color separation table used to separate an input color into a plurality of color agent colors, said program comprising:

a first table generation unit for generating color separation data on a first line that connects white and black points in the color separation table;

a second table generation unit for generating color separation data on a plurality of second lines each of which connects the white point and each of primary color points each expressed by one of the color agent colors and secondary color points each expressed by two of the color agent colors;

a third table generation unit for generating color separation data on a plurality of third lines each of which connects each of the primary and secondary color points and the black point;

a fourth table generation unit for generating color separation data on a plurality of fourth lines each of which connects the primary and secondary color points; and an interpolation unit for generating color separation data at grid points inside a three-dimensional color space by an interpolation process based on the color separation data on the first to fourth lines, wherein said interpolation unit executes an interpolation process using a finite element method for each triangular plane specified on the color space.

* * * * *